US009591157B2

(12) United States Patent
Uroskin et al.

(10) Patent No.: US 9,591,157 B2
(45) Date of Patent: Mar. 7, 2017

(54) APPARATUS, SYSTEM AND METHOD FOR CONTROLLING AN IMAGE PROCESSING DEVICE VIA A MOBILE DEVICE

(71) Applicants: Canon Information and Imaging Solutions, Inc., Melville, NY (US); Canon U.S.A., Inc., Melville, NY (US)

(72) Inventors: Konstantin Uroskin, New York, NY (US); Nigel Patrick Brady, Irvine, CA (US)

(73) Assignees: CANON INFORMATION AND IMAGING SOLUTIONS, INC., Melville, NY (US); CANON U.S.A., INC., Melville, NY (US)

( * ) Notice: Subject to any disclaimer, the term of this patent is extended or adjusted under 35 U.S.C. 154(b) by 0 days.

(21) Appl. No.: 14/739,856

(22) Filed: Jun. 15, 2015

(65) Prior Publication Data

US 2016/0366294 A1 Dec. 15, 2016

(51) Int. Cl.
*G06F 15/00* (2006.01)
*H04N 1/00* (2006.01)
(Continued)

(52) U.S. Cl.
CPC ..... *H04N 1/00503* (2013.01); *G06F 3/04842* (2013.01); *G06F 3/04845* (2013.01); *G06F 3/04847* (2013.01); *G06F 3/04886* (2013.01); *G06F 17/243* (2013.01); *G06F 17/2705* (2013.01); *H04N 1/00307* (2013.01);
(Continued)

(58) Field of Classification Search
USPC .............................. 358/1.13–1.16
See application file for complete search history.

(56) References Cited

U.S. PATENT DOCUMENTS 7,419,100 B2 9/2008 Groeneboer et al.
2009/0103124 A1 4/2009 Kimura et al.
(Continued)

OTHER PUBLICATIONS

"Xerox WorkCentre 7800 Series Multifunction Printer", 2013, http://www.office.xerox.com/latest/W78BR-01.PDF.

*Primary Examiner* — Saeid Ebrahimi Dehkord
(74) *Attorney, Agent, or Firm* — Canon USA Inc., IP Division

(57) ABSTRACT

An image processing device is provided that generates a graphical user interface including at least one image element that enables receipt of a data value of a particular type therein, the graphical user interface being generated in response to selecting a processing job to be performed by the image processing device. The generated graphical user interface is mirrored to a mobile computing device by transmitting data representative of the graphical user interface to a mobile computing device via a short distance communication protocol. A return data object is received, via the short distance communication protocol, that represents a modified graphical user interface including the at least one image element having the data value of the particular type, the data value having been provided using mobile computing device. The image processing device initiates execution of the processing job to generate job data and automatically associating the data value derived from the modified graphical user interface with the generated job data.

20 Claims, 8 Drawing Sheets

(51) Int. Cl.
*G06F 3/0484* (2013.01)
*G06F 17/27* (2006.01)
*G06F 17/24* (2006.01)
*G06F 3/0488* (2013.01)

(52) U.S. Cl.
CPC ..... *H04N 1/00474* (2013.01); *H04N 1/00493* (2013.01); *H04N 2201/0075* (2013.01); *H04N 2201/0094* (2013.01)

(56) References Cited

U.S. PATENT DOCUMENTS

| | | |
|---|---|---|
| 2013/0201515 A1 | 8/2013 | Daos et al. |
| 2013/0208300 A1 | 8/2013 | Sakura |
| 2013/0335772 A1 | 12/2013 | Waller et al. |
| 2014/0168696 A1* | 6/2014 | Matsuhara ......... H04N 1/00307 358/1.15 |
| 2015/0116760 A1* | 4/2015 | Kim .................. H04N 1/00503 358/1.15 |

* cited by examiner

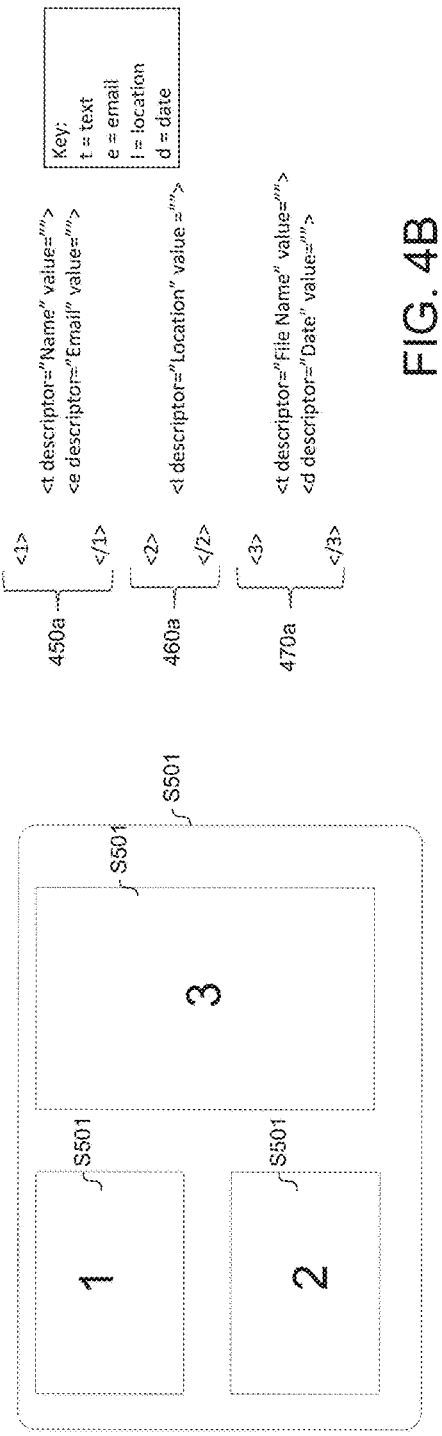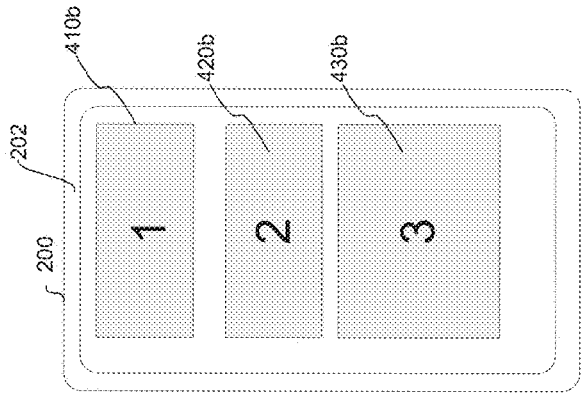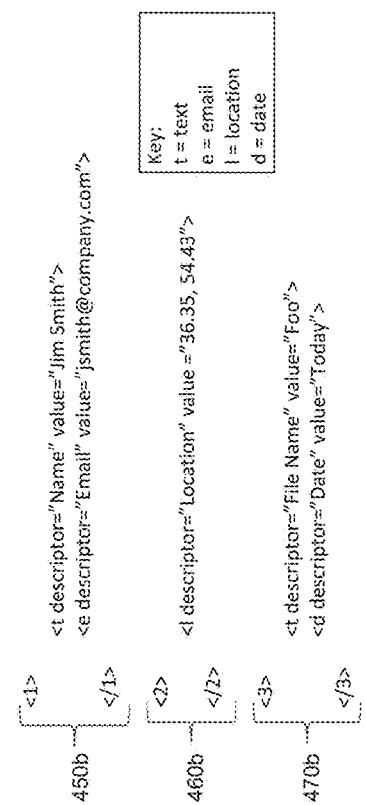

APPARATUS, SYSTEM AND METHOD FOR CONTROLLING AN IMAGE PROCESSING DEVICE VIA A MOBILE DEVICE

BACKGROUND OF THE INVENTION

Field of the Invention

The present invention relates generally to controlling an image processing device, more specifically, to using a mobile computing device to control an image processing device.

Description of the Related Art

Image processing devices may include a plurality of different image processing functions. For example, an image processing device may include any one of a multifunction peripheral, copier, scanner, printer, or other image processing device, and provide the corresponding functionality. The image processing device enables a user to execute various functions, features, and user interfaces in order to perform particular tasks. By way of example, the image processing device and/or application executing on the image processing device may provide functionality for making photocopies, printing a document, scanning a document and generating an electronic document representing the scanned document, transmitting data over a network, accessing a database on a remote server, or other task.

As image processing devices have grown in complexity and ability to offer many different types of functionality in different environments, the ability to control and operate the image processing devices have been updated to reflect these capabilities. It is not uncommon for image processing devices to have built-in display screens that present various options for controlling the operation of these devices. However, a drawback associated with these configurations relate to the complexity of applications executing on the image processing device and attempting to interact with various display images to accomplish a specific task. These issues are further exacerbated when a mobile computing device is being used to do so. A system according to invention principles remedies any drawbacks associated with these conventional systems.

BRIEF SUMMARY OF THE INVENTION

Methods, systems, and computer-readable media for processing image file data are described.

In one embodiment, an image processing device is provided that generates a graphical user interface including at least one image element that enables receipt of a data value of a particular type therein, the graphical user interface being generated in response to selecting a processing job to be performed by the image processing device. The generated graphical user interface is mirrored a mobile computing device by transmitting data representative of the graphical user interface to a mobile computing device via a short distance communication protocol. A return data object is received, via the short distance communication protocol, that represents a modified graphical user interface including the at least one image element having the data value of the particular type, the data value having been using mobile computing device. The image processing device initiates execution of the processing job to generate job data and automatically associating the data value derived from the modified graphical user interface with the generated job data.

In another embodiment, a mobile computing device is provided and includes one or more processors and one or more computer-readable media coupled to the one or more processors, the one or more computer-readable media storing instructions that, when executed by the one or more processors, cause the one or more processors to receive a form data object generated by an image processing device using a short distance communication protocol, the form data object representing a form displayed in a graphical user interface of an image processing device and including configuration data used to generate a mobile device user interface including at least one image element have a particular data type associated therewith. The form data object is parsed to determine a type of data associated with the at least one image element and function executed by the mobile computing device for inputting a data value corresponding to the determined type of data is selected. A mobile user interface is generated based on the form data object and including the selected function enabling receipt of the data value input by a user of the mobile computing device and a return data object including the at least one image element and data value entered by the user via the selected function is created. The return data object is transmitted via the short distance communication protocol, to the image processing device enabling completion of the form graphical user interface using the data value entered via the mobile computing device.

A system for inputting data values into a form displayed on an image processing device using a mobile computing device, the system comprising an image processing device that generates a graphical user interface including at least one image element enabling receipt of a data value of a particular type therein, the graphical user interface being generated in response to selecting a processing job to be performed by the image processing device and mirrors the generated graphical user interface on the mobile computing device by transmitting data representative of the graphical user interface to the mobile computing device via a short distance communication protocol. The system further includes a mobile computing device that receives the data representing the graphical user interface via the short distance communication protocol from the image processing device, parses the data representing the graphical user interface to determine a type of data associated with the at least one image element, selects a function executed by the mobile computing device for inputting a data value corresponding to the determined type of data; generates the mobile user interface based on the form data object and including the selected function enabling receipt of the data value input by a user of the mobile computing device, creates a return data object including the at least one image element and data value entered by the user via the selected function and transmits the return data object, via the short distance communication protocol, to the image processing device. In response to receiving the return data object via the short distance communication protocol, the data values entered via the mobile computing device complete data entry for at least one image element, and the image processing device initiates execution of the processing job to generate job data and automatically associates the data value derived from the modified graphical user interface with the generated job data.

Further features of the present invention will become apparent from the following description of exemplary embodiments with reference to the attached drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 4A-4D illustrate the process of creating, transmitting and use a form data object and creating and transmitting a return data object.

DETAILED DESCRIPTION OF THE INVENTION

Figure 1:
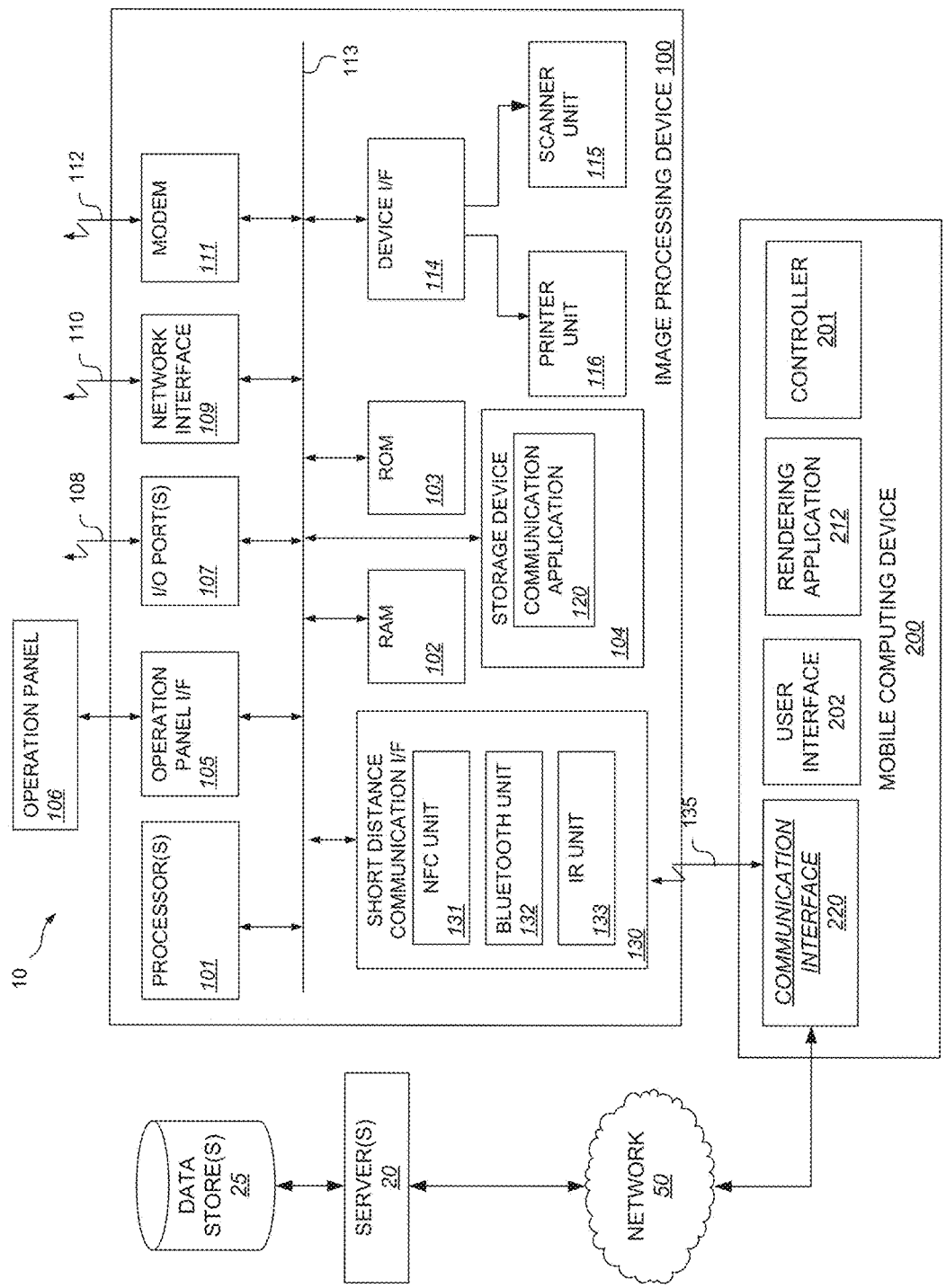
FIG. 1 illustrates an exemplary network environment.

Embodiments of the present invention are described with reference to the drawings. FIG. 1 illustrates an example network environment 10. The networked environment 10 depicts an image processing device 100, at least one mobile computing device 200 and at least one server 20 electrically and communicatively coupled to at least one data store 25. In this environment, the image processing device 100 may selectively communicate with the mobile computing device in one of two ways. In a first mode of connection, the image processing device 100 may directly communicate with the mobile computing device via a short distance communication protocol. In a second mode of connection, the image processing device 100 may connect to the mobile computing device 200 via the communications network 50. In this environment, the at least one server 20 may include at least one application executing thereon and which provides predetermined type of functionality. The at least one application may be accessible by either the image processing device 100 and/or the mobile computing device 200 via the communication network 50. The number and types of devices shown herein are provide for purposes of example only and should not be construed as limiting in terms of number and types of devices able to be interconnected by network 50.

The image processing device 100 illustrated in FIG. 1 may be a multifunction peripheral having a scanning function in addition to printing, copying and other functions. However, it will be understood that various other implementations of an image processing device are within the scope of the present invention. For example, various components, modules, functions, and/or configurations of the image processing device 100 of FIG. 1 could be combined, deleted, or modified to form further implementations. Further by way of example, in some embodiments, other devices (for example, other devices having scanning capabilities) and/or servers (for example, a computer connected to a scanner) may be implemented as the image processing device 100.

In some embodiments, the image processing device 100 performs one or more operations described herein. In some embodiments, the image processing device 100 provides functionality described herein. In some embodiments, software running on the image processing device 100 performs one or more operations described herein. In certain embodiments, applications executing on the image processing device 100 and which provide specific types of functionality are in communication with and bidirectional communicate data between the applications executing on the image processing device 100 and at least one mobile computing device 200 via a short distance communication protocol as will be discussed below.

The image processing device 100 includes one or more processor(s) 1201. The processor(s) 101 include a central processing unit (CPU) that performs overall control functions for the image processing device 100. The CPU uses a random access memory (RAM) 102 as a work area while executing instructions. The CPU executes instructions of various programs stored in one or more memory devices 104. For example, the CPU executes programs stored in a read only memory (ROM) 103 and in a storage device 104.

In some embodiments, the processor(s) 101 include one or more processors in addition to the CPU. By way of example, the processor(s) 101 may include one or more general-purpose microprocessor(s), application-specific microprocessor(s), and/or special purpose microprocessor(s). Additionally, in some embodiments the processor(s) 101 may include one or more internal caches for data or instructions.

The processor(s) 101 provide the processing capability required to execute an operating system, application programs, and various other functions provided on the image processing device 100. The processor(s) 101 perform or cause components of the image processing device 100 to perform various operations and processes described herein, in accordance with instructions stored in one or more memory devices 104.

The RAM 102 is used as a work area when the processor(s) 101 execute various instructions, such as those making up computer programs stored in the ROM 103 and/or the storage device 104. The RAM 102 may be used as a temporary storage area for various data, including input image data and data created by an application executing on the image processing device 100 or data received from one or more mobile computing devices 200 which is then further processed by one or more applications executing on the image processing device 100. The RAM 102 may be used as a cache memory. In some embodiments, the RAM may be dynamic RAM (DRAM) or static RAM (SRAM).

The ROM 103 stores data and programs having computer-executable instructions for execution by the processor(s) 101. In some embodiments, the ROM 103 is a boot ROM, storing instructions for the booting process. In some embodiments, the ROM 1203 may be flash memory. In certain instances, the ROM 103 may include an operating system for controlling the operation of the image processing device 100. In this case, an operating system application stored in ROM 103 (or alternatively stored in the storage device 104 and accessible once the boot routine of the image processing device 100 is completed), contains a catalog of other applications executing on the image processing device and provide information about such other executing applications to one another enabling interoperation there between.

An operation panel interface 105 provides output signals to and receives input signals from an operation panel 106. Regarding the output signals, the operation panel interface 105 provides GUI data to the operation panel 106 for display on a display device such as liquid crystal display (LCD) or an light emitting diode display (LED). Regarding the input signals, the operation panel interface 105 receives input signals based on user input operations at the operation panel 106 and relays the input signals to the processor(s) 1201. In some embodiments, the operation panel 106 includes a touch sensitive element operable to receive user input operations or commands based on the touching of graphical objects displayed on the display. In some embodiments, the operation panel 106 includes a hard key panel.

The image processing device 100 includes one or more input/output (I/O) port(s) 1207. The I/O port(s) 107 may include any suitable interface type such as a universal serial bus (USB) port, FireWire port (IEEE-1394), serial port, parallel port, or AC/DC power connection port. The I/O port(s) 107 enable one or more external device(s) 108 to communicate with the image processing device 100 when the external device(s) 108 is/are connected to the I/O port(s) 107.

A network interface 109 includes hardware, software, or both providing one or more interfaces for communication (such as, for example, packet-based communication) between the image processing device 100 and one or more other servers or one or more networks 110. As an example and not by way of limitation, the network interface 109 may include a network interface card (NIC) or a network controller for communicating with an Ethernet or other wire-based network or a wireless NIC (WNIC) or wireless adapter for communicating with a wireless network, such as a WI-FI network. This disclosure contemplates any suitable network 110 and any suitable network interface 109 for it. As an example and not by way of limitation, the image processing device 100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks 110 may be wired or wireless. As an example, the image processing device 100 may communicate with a wireless PAN (WPAN) (such as, for example, a BLUETOOTH WPAN), a WI-FI network, a WI-MAX network, or other suitable wireless network or a combination of two or more of these. The image processing device 100 may include any suitable network interface 109 for any of these networks 110, where appropriate.

A system bus 113 interconnects various components of the image processing device 100 thereby enabling the transmission of data and execution of various processes. The system bus 113 may include one or more types of bus structures including a memory bus or memory controller, a peripheral bus, and a local bus using any of a variety of bus architectures.

The device interface 114 is connected to the scanner unit 115 and to the printer unit 116. The device interface 114 performs synchronous/asynchronous conversion of image data.

The scanner unit 115 includes a light source and an image sensor. The scanner unit 115 may include a glass platen and/or an automatic document feeder (ADF). In operation, the light source illuminates a physical document positioned on the glass platen or fed by the ADF. Light reflected by the physical document reaches the image sensor, and the image sensor converts the light into electrical signals. In some embodiments, the scanner unit 115 includes an optical system (for example, mirrors, lens) that directs the light to the image sensor. After the image sensor generates the electrical signals, an analog-to-digital converter converts the electrical signals to digital image data representing the scanned physical document. The scanner unit 115 then outputs the digital image data to one or more other components of the image processing device 100 via the device interface 114.

The printer unit 116 is an image output device for printing on a sheet an image corresponding to image data. In response to a print command received at the image processing device 100, the printer unit 116 receives image data via the device interface 114 and outputs to a sheet an image corresponding to the image data.

Image processing device 100 may also include a short distance communication interface (UF) 130. The short distance communication interface 130 facilitates communication between one or more applications executing on the image processing device 100 and at least one mobile computing device 200 using one or more short distance communication protocols. Thus, the short distance communication interface 130 includes a near field communication unit 131 (for example, an NFC reader) enabling bidirectional communication with a mobile computing device having NFC functionality. The NFC unit 131 includes circuitry and software that enables transmission (writes) and reception (reads) of commands and data with a non-contact type device using a short distance wireless communication technique such as NFC (Near Field Communication; ISO/IEC IS 18092). In other embodiments, the short distance communication interface 130 may also include a BLUETOOTH communication unit 132 that includes a transceiver capable of transmitting and receiving data via short wavelength radio waves ranging in frequency between 2.4 GHz and 2.485 GHz. In other instances, the short distance communication interface 130 may also include an infrared (IR) unit that can emit and sense electromagnetic wavelengths of a predetermined frequency have data encoded therein. Furthermore, while not specifically shown, the short distance communication interface may also include a smart card reader, radio-frequency identification (RFID) reader, device for detecting biometric information, a keyboard, keypad, sensor(s), a combination of two or more of these, or other suitable devices. In another embodiment, the short distance communication interface 130 may include an optical scanner configured to capture and scan image data representative of an identification code such as a barcode or a QR code. In these embodiments, the capture and processing of a particular identification code may initiate the short distance communication between the mobile computing device 200 and the image processing device 100.

The depiction of the short distance communication interface 130 is done merely to facilitate the understanding of the operation of the present arrangement and it should be understood that the short distance communication interface 130 may also be embodied as part of the I/O ports 107 and/or the network interface 109.

A storage device 104 stores application data, program modules and other information. One or more program modules stored in the storage device 1204 are configured to cause various operations and processes described herein to be executed. The storage device 104 also stores other programs and data to be processed. For example, the storage device 104 stores an operating system including programs and data for managing hardware and software components of the image processing device 100. Applications on the image processing device 100 may utilize the operating system to perform various operations. The storage device 104 may further store other programs and/or drivers that enable various functions of the image processing device 1200, graphical user interface (GUI) functions, and/or processor functions. The storage device 104 may also store data files including, for example, image data, user data, configuration information, GUI components, such as graphical elements or templates, or other data required by the image processing device 100.

In some embodiments, the image processing device 100 includes one more applications including one or more programs for controlling access to one or more resources on the image processing device 100. In some embodiments, applications stored in the storage device 104 includes one or more programs for controlling access to one or more applications (or particular functionality thereof) executing on the image processing device 100.

In some embodiments, access to one or more resources of the application is controlled based on a credential associated with the entity attempting to access the one or more resources of the application. Policies for controlling access to various resources of the application may be stored at the image processing device 100. In other embodiments, access control policies may reside in a centralized or enterprise server remotely located from the image processing device 100. Once access to an application is granted, a user gains access to one or more resources of the application, including task-specific functionality of the application. The task-specific functionality of the application may enable the user to perform one or more tasks using the application. For example, the application 100 may provide various functions, features and user interfaces for processing image data, transmitting data over a network, managing one or more databases, or other tasks. In some embodiments, the application 100 is configured to use one or more resources of the image processing device 100 to perform a process in response to an instruction from the user.

An application executing on image processing device 100 may use functionality of and/or information on the image processing device 100 to employ hardware, software, or both for that provides scanning functionality. For example, the image processing device 100 may include an image sensor or a camera for capturing an image.

In certain embodiments, the application executing on the image processing device 100 provides communication functionality for transmitting image file (or other electronic document data file format) via the network 50 to any other computing system and/or server 106 connected thereto. The communication functionality of the application may be implemented by interaction with the network interface 109 which converts data into a transmissible data form able to be communicated over a network 50 to server 106 (or other computing system). In addition to, or instead of using the network interface 109, application functionality that requires transmission of data may be performed using the short distance communication interface 130 (including any and all types of short distance communication described herein). The application may also enable the image processing device 100 to receive instruction data from other systems on the network 50 enabling access to and control of any functionality provided by application. The receipt of data from the server 106 or other computing device may similarly occur using any of the network interface 109, short distance communication interface 130 or the like. The communication functionality of application may also enable the image processing device 101 to receive and process data objects generated by any system connected to the image processing device 101 via the network 50.

In some embodiments, the application executing on the image processing device 100 provides functionality for maintaining and accessing information in a data structure, which may be any suitable data structure for organizing data. For example, information associated with a user or process may be added as one or more entries into a data structure. The application executing on the image processing device 100 may store and/or retrieve data in a memory or on a hard disk of the image processing device 100. In some embodiments, the image processing device 100, when executing the application, may perform various operations with respect to a data store. Examples of operations include adding entries to a data store; deleting entries from a data store; modifying entries in a data store; searching for entries in a data store; and retrieving entries from a data store. The data store management functionality provided by application discussed above is also applicable to data stores located on remote computing systems and/or servers connected to the image processing device 100 via the network 50.

The application executing on the image processing device 100 may provide functionality for generating information and providing the information to a user interface of the image processing device 100 displayed on operation panel 106. The information may include text, images, form elements, files, executable programs, or other suitable information. The information provided by the application may include content for display on a display of the image processing device 101.

In another embodiment, the storage device 104 stores a communication application 120 that generates a form data object representative of a user interface generated by and displayed on a display screen of the image processing device. The communication application communicates the format data object to at least one mobile computing device 200 via a short distance communication protocol such thereby enabling the user interface of the image processing device can be mirrored on a display of the mobile computing device 200. As such, a form will be presented on the display of the mobile computing device, with a user fillable form that will receive input data from the user via one or more user input mechanisms of the mobile computing device 200. The communication application 120 executing on the image processing device 100 receives a return data object from the mobile computing device including a plurality of data values corresponding to the input requested in the form data object for use by one or more other applications executing on the image processing device 100. In some embodiments, the application 120 resides on the storage device 104 and executes on the image processing device 100. In this manner communication application 120 advantageously improves the functionality of image processing device 100 by providing an enhanced manner for a user to interact with and control the image processing device 100. More specifically, by exporting data representing a form data object resulting in the automatic generation of a fillable form on a mobile computing device 200, the communication application 120 provides enables the image processing device 100 to operate in a manner that was heretofore unable to operate. More specifically, the mirroring of the display screen provides the user with the ability to use a more familiar mechanism or device for entering information about a processing job to be executed by the image processing device 100. For example, when a user wishes to complete a scan or print job, there may be some additional data describing various aspects of the job data and the user may advantageously enter such data using the mobile computing device. Moreover, the mirroring functionality advantageously reduces the time and effort needed to enter the data because, by automatically displaying the user interface on the mobile device, the communication application 120 allows the user to leverage the capabilities of the mobile computing device for the purpose of entering data describing a job to be executed by the image processing device. A further advantage associated with communication application 120 is that an image processing device 100 may receive specific types of data as input data values that originate on a mobile computing device 120 but which an image processing device 100 was unable to previously access or obtain. As such, the form data object advantageously interacts with an operating system of the mobile computing device to identify particular applications executing thereon that could provide the specific types of data requested in the form data object and enable to user to actively a respective one of the identified applications to acquire the specific type of data which is then provided back to the user as the return data object. In this manner, the communication application 120 allows the image processing device to receive, as input data values, types of data that it would otherwise not be able to receive.

The communication application 120 executed by the one or more processors 101 of image processing device 100 may include at least one program that, when executed by one or more processors 101, cause the one or more processors to perform one or more operations described herein.

In some embodiments, the image processing device 100 may include other storage media. By way of example, and not by way of limitation, the storage media may include a floppy disk drive, flash memory, an optical disc, a magneto-optical disc, magnetic tape, or a Universal Serial Bus (USB) drive or a combination of two or more of these. Where appropriate, the storage media may include removable or fixed media. Where appropriate, the storage media may be internal or external to the image processing device 100. In some embodiments, the storage media is non-volatile, solid-state memory. The storage media may take any suitable physical form. For example, the storage media may be in the form of one or more removable blocks, modules, or chips. The computer-readable storage medium need not be one physical memory device, but can include one or more separate memory devices.

Further depicted in FIG. 1 is the mobile computing device 200. The mobile computing device includes hardware, software, or both for providing the functionality of thereof. In some embodiments, the mobile computing device 200 may be a smartphone. In other embodiments, the mobile computing device 200 may be a tablet computing device. However, the mobile computing device 200 is a portable computing device that may be easily portable by a user such that it may be carried in one hand and brought into close proximity to the image processing device 100. As shown in FIG. 1, the mobile computing device includes a subset of the actual components typically included therein and is presented to described it interoperation with the image forming apparatus 100. A more detailed description of a set of exemplary components that comprise the mobile computing device 200 will be described hereinafter with respect to FIG. 2.

The mobile computing device 200 includes a controller 202 that may include one or more central processing units which provide processing capabilities to allow the mobile computing device 200 to perform any and all functionality associated therewith. The controller 202 accesses and executes one or more applications that provide the mobile computing device 200 with its various functionality. Examples of applications stored in a memory of a mobile computing device 200 and which provide predefined functionality include, but are not limited to, (a) communication application enabling the use to make and receive telephone calls either using a cellular network or via a broadband connection (e.g. VoIP); (b) a packet communication application that allows for bidirectional communication of packetized data; (c) a web browsing application that enables a user to locate, access and interact with a resource on the internet; (d) a management application that manages a set of contacts and related contact information; (e) a global positioning system application that communicates with various global positioning satellites enabling the mobile computing device 200 to be located at any given time; (f) an image capturing application that engages image capturing hardware of the mobile computing device to capture still and/or moving images either alone or in combination with ambient sounds as audio data; (g) at least one application that provides access to a cloud-based system or application stored on server 20 such as a social media application (e.g. FACEBOOK, LINKEDIN, INSTAGRAM, etc.) and/or a cloud-based data storage service (e.g. DROPBOX, BOX, etc.).

As shown herein, the mobile computing device 200 includes a user interface 202, a memory having at least one rendering application 212 stored therein such that the controller 201 can execute the processing functions including but not limited to, accessing and executing rendering application 120 and generating a plurality of graphical user interfaces for display by (or on) the user interface 202. The depiction of components of the mobile computing device 200 shown in FIG. 1 should not be construed as limiting and additional hardware components and circuits that comprise the image processing device will be described hereinafter with respect to FIG. 2, the complete description of which is applicable to image processing device 101 of FIG. 1.

The mobile computing device 200 may perform one or more steps of one or more methods described or illustrated herein. In some embodiments, software running on the mobile computing device 200 performs one or more steps of one or more methods described or illustrated herein to provide functionality described or illustrated herein. By way of example, the mobile computing device 200 may include at least one processor that can execute at least one set of instructions stored in at least one type of memory in order to provide the functionality described herein.

The rendering application 120 executed by the controller 201 of the mobile computing device may include at least one program that, when executed by one or more processors 201, cause the one or more processors to perform one or more operations described herein.

In one embodiment, the rendering application 212 receives a form data object from an image processing device 100 via a short distance communication protocol such as NFC using the communication interface 220. The communication interface 220 includes short distance communication units similar to those described above with respect to the short distance communication interface 130 of the image processing device 100. The communication interface 220 also enables the mobile computing device 200 to contact and communicate with remotely located server 106 and other computing device via network 50. Additionally, while the following discussion describes communication between the mobile computing device 200 and image processing device 100 via a short distance communication protocol, it should be understood that this is not the only means of communicating between these devices and that these devices may also communicate via network 50. Further description of the communication interface 220 of the mobile computing device 200 will be provided in FIG. 2.

The form data object is received from the image processing device 100 in response to the mobile computing device 200 being brought into close proximity to the image processing device 100. As used herein, close proximity means equal to or less than a threshold distance as determined by the particular short distance communication protocol. The form data object includes configuration data identifying at least one type of data that needs to be entered into the image processing device 100 for a given processing job and at least one manner in which the at least one type of data is to be entered using the mobile computing device. The configuration data is further used by the rendering application 212 to generate a graphical user interface for display on user interface 202.

The user interface 202 includes hardware, software, or both for providing the functionality of the user interface 202. The user interface 202 may receive input signals from a user and generate output signals that are displayed by a display device. The display device may be embodied within the user interface 202 or electrically coupled thereto. The user interface 202 facilitates interaction between a user and the mobile computing device 200. In some embodiments, the user interface 202 facilitates the interaction between the mobile computing device 200 and the image processing device 100 and the one or more servers 20.

The user interface 202 may receive information from the rendering application 212 signals that controls the operation of the user interface 212 to implement the functions of the rendering application 212. In some embodiments, the information received from the application 212 includes data objects defining the structure and type of output to be generated by the user interface 202. By way of non-limiting example, the application 212 may output data objects representative of elements to be included in a graphical user interface associated with at least one of the functions of application 212. The user interface 202 may use these data objects and generate the graphical user interface based on these data objects.

In some embodiments, the user interface 202 receives input data signals generated by an input/output (I/O) device in order to facilitate the interaction referenced above and described in further detail below. Exemplary I/O devices include but are not limited to keyboards, mouse, touch sensitive displays, microphones, gesture-based input devices and the like.

Turning now to the an exemplary manner in which the rendering application 212 may control and utilize the user interface 202, a set of different types of data required to be input into a form generated in response to receipt of the form data object with be discussed. For example, the at least one type of data may include a user name and the manner in which the data is to be entered may be a free-form text field. As such, a free form text field would be displayed in the resulting GUI displayed on user interface 202 and, when selected by a user, result in the automatic launching the display of a mobile keyboard on the user interface 202 of the mobile computing device. This enables the user to advantageously select alphanumeric characters by selecting user selectable image elements from within the mobile keyboard for entry into the displayed data field.

In another embodiment, a respective type of data may be data provided by a particular application executing on the mobile computing device 200. For example, the type of data may be location data. As such, the form data object may query the operating system to access a global positioning system application executing on the mobile computing device 200 and request location therefrom (e.g. GPS coordinates). In another embodiment, instead of (or in addition to) using a GPS application, the operating system may be queried to access a cell tower triangulation application that can selectively determine location data based on a cell tower triangulation algorithm which may measure power levels and antenna patterns. Additionally, the triangulation application may perform signal interpolation between two adjacent towers. The manner in which the triangulation application operates is described for purpose of example only and any algorithm that can make use of signals from various cell towers to identify a position of a particular mobile computing device. In this manner, the field for location data may be automatically filled when the form data object is used by the rendering application 212 and displayed on user interface 202.

In a further embodiment, the form data object may require image data as an input data value. In this embodiment, the form data object would identify that image data is required and query the operating system of the mobile computing device 200 to identify at least one application executing that would be able to provide the requested image data. This may result in generating individual user selectable image elements within the form displayed on the user interface 200 of the mobile computing device that are associated with different types of applications. For example, a first image element associated with accessing an image capture device of a mobile computing device 200 may be generated whereby selection thereof would initiate execution of an image capture application using an image capture device (e.g. camera) of the mobile computing device 200. Additionally, a user selectable image element associated with a gallery application which controls a gallery of previously captured images may also be included such that, when selected, the mobile computing device will display a set of candidate images that have previously been captured or otherwise acquired (e.g. via text, email, etc.) for inclusion into the form data object.

In yet a further embodiment, the form data object may identify that biometric data is a required type of data for the particular job being processed by the image processing device. For example, a type of biometric data may be fingerprint data which may be useful as an added security measure associated with the job to be executed on by the image processing device 100. The rendering application 120 queries the operating system to identify the component of the mobile computing device able to provide the biometric data and generates a user selectable image element able to provide the required data. In the example where the biometric data is fingerprint data, selection of the image element displayed in the user interface 202 of the mobile computing device may initiate processing of a finger print scanning application that can scan and capture image data representative of a user's fingerprint as an input data value. Another type of biometric data may be retina data which represents an image of a user's retina. For this type of data, selection of the user selectable image element may initiate execution of a respective image capture device (e.g. the forward facing camera) such that a user may capture an image of their retina for inclusion as data in the form generated by rendering application 212.

In another exemplary embodiment, the rendering application 212 may provide a user access to a further computing device connected therewith such as a wearable computing device. The wearable computing device may include one or more other types of input sensors able to sense or otherwise determined data from the user which could then be input into the form displayed on the user interface 202 of the mobile computing device. In one example, a wearable device may be a head mounted computing device that covers at least one eye of a user with a display screen. This wearable device may include a sensor that can capture biometric data such as an image of the user's retina which can then be communicated to the mobile computing device and included into the form displayed by the rendering application.

In a further exemplary embodiment, the wearable device may include one or more biometric sensors configured to capture one of a heart rate and heartbeat associated with the user which can then be stored as a data value and included into the form generated by the rendering application 212.

In another exemplary embodiment, the rendering application 212 may provide a user selectable image element that initiates an application executing on a remote server such as server 20. In this embodiment, selection of the remote application image element results in the mobile computing device 200 using the communication interface 220 to communicate with the remote application on server 20 to retrieve the required type of data. For example, the remote application may be cloud storage application and the mobile computing device may initiate a client application executing on the mobile computing device that is used to access the cloud storage application allowing the user to navigate and select a particular data object stored on the cloud storage application. Once selected, the mobile computing device 220 may generate a request for the selected data object to be transmitted by the communication interface 220 via the network 50 to the cloud storage application executing on server 20 which can then parse the request and locate the requested data object that is, for example, stored in data store 25. The requested data object may be received from the cloud storage application via network 50 and the rendering application 212 may include the retrieved data object into the form being displayed via the user interface.

Once the form displayed generated by the rendering application 212 has been completed to include all of the types of data requested thereby, the rendering application saves the completed form as a return data object including all of the types of data input by the user using the mobile computing device. The return data object is transmitted via the short distance communication protocol to the image processing device 100 which extracts, using the communication application, the types of data included in the return data object. The communication application may associate the input data values with the job to be processed. In another embodiment, the types of data may be used by the communication application 120 as inputs values for other application executing on the image processing device. For example, in the embodiment where the type of data is biometric data, the communication application may use a data object representing fingerprint data as an input to a security authentication application which can perform secure authorization by comparing the fingerprint data received from the mobile computing device with a catalog of fingerprint data of authorized users.

In some embodiments, the communication application 120 and/or the rendering application 212 may provide one or more of the above described functions by creating one or more data objects associated with one or more of the above functions. For example, the applications can create a data object that enables one of creating a file based on information contained in the data object, attaching a file to the data object and/or associating a file with the data object. The file may be any suitable file type used in providing the functionality of the application. The data object is information which may be incorporated in and/or used by the application. In some embodiments, the data object is processed as an entity distinct from other information or components incorporated in or used by the application. The data object may include information grouped together by the application. A representation of the data object may be presented in a graphical user interface (GUI) as a discrete unit, which may include one or more elements. In some embodiments, the data object may be stored in one or more locations. The data object may include one or more of the following: a data entry, a file, a portion of a file, executable code, a form element, an image, or other content. The application 103 and the associated data object may be any suitable software application and data object, respectively.

In certain embodiments, the rendering application 212 may include a browser executing thereon. The browser may be a web browser such as MICROSOFT INTERNET EXPLORER, GOOGLE CHROME or MOZILLA FIREFOX, and may be used to access a resource, such as a web page. The browser may enable a user to display and interact with text, images, form elements, or other information typically located on a web page served by a web server on the World Wide Web or a local area network. The browser may support various types of downloadable, executable, software modules, such as applets or plug-ins. For example, the browser may incorporate a virtual machine configured to execute a program, such as a JAVA applet, embedded in a web page accessed by the browser. The image processing device 101 may have various add-ons, plug-ins, or other extensions for use in or with the browser.

In some embodiments, the browser may display a collection of text and image elements that are accessible by a user and which enable the user to perform any of the functionality set forth above with respect to application 212. In this type of embodiment, the functionality of application 103 may be implemented by the server 20 and selectively accessible, via network 50, by the browser.

The server 50 includes hardware, software, or both for providing the functionality of the server 50. The server 50 may include one or more servers. For example, the server 50 may include one or more application(s) servers, authentication servers, web servers, file servers, database servers or mail servers. In some embodiments, the server 50 is unitary. In some embodiments, the server 50 is distributed. The server 50 may span multiple locations. The server 50 may span multiple machines.

The server 50 may include a document management system application for managing and organizing electronic document data into electronic document projects and provide access to users thereof. In one example the document management system application executing on server 50 provides secure access to a set of electronic document data and allows users to acquire copies thereof for reproduction via a printer or image processing device.

The network 50 couples the one or more servers 50 and one or more image processing devices 100 and one or more mobile computing devices 200. The network 50 may be any suitable network. For example, one or more portions of the network 50 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. The network 50 may include one or more networks.

It should be understood that the architecture and systems describe hereinabove with respect to FIG. 1 are merely representative and should not be construed as limiting. The architecture in which the present invention is operative may include any number of image processing devices, computing systems and/or servers. Moreover, the functionality described above is described to facilitate the understanding of invention principles and one or more of the component systems described individually may be combined with any of the other components described therein.

Figure 2:
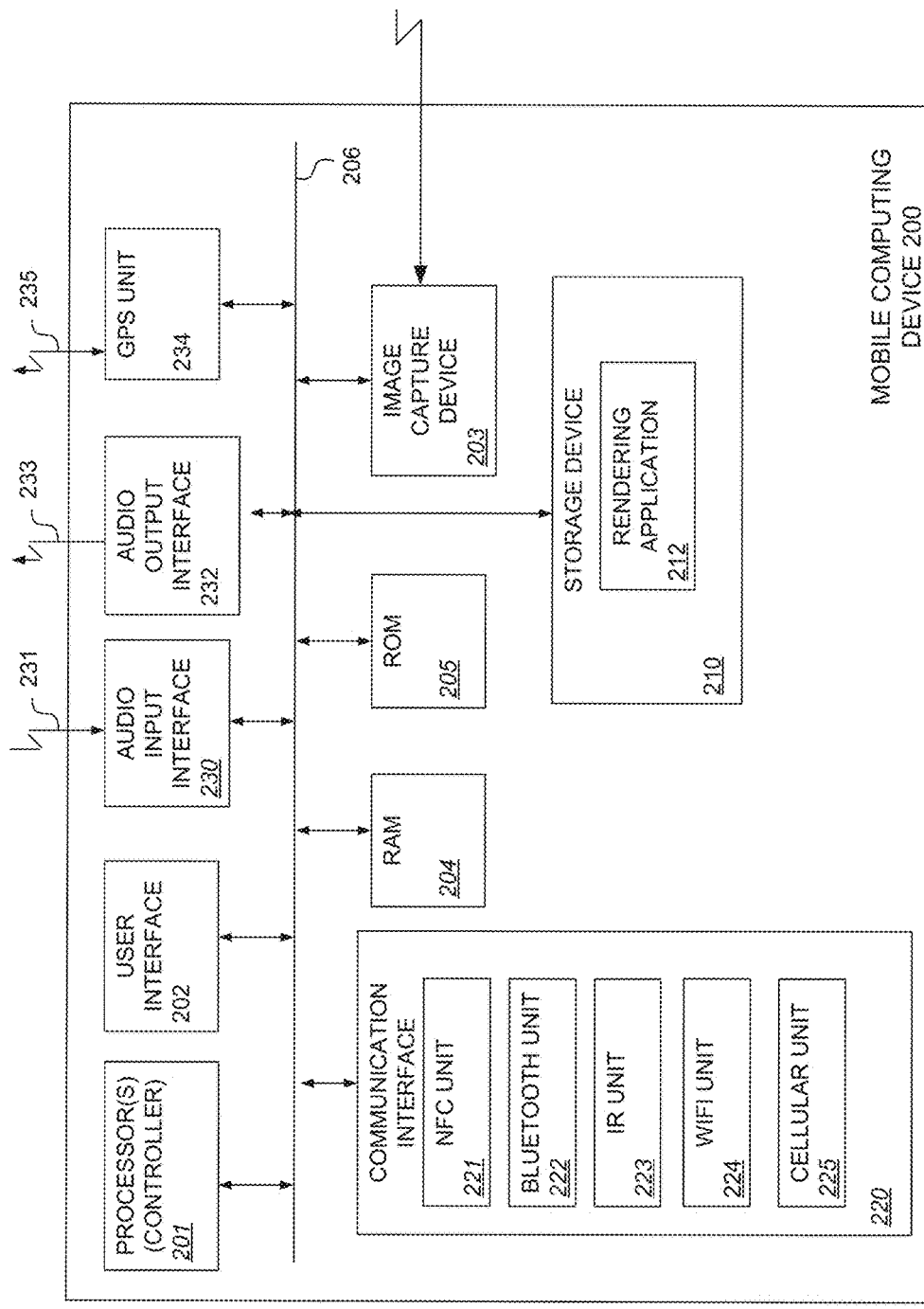
FIG. 2 illustrates an exemplary mobile computing device

FIG. 2 provides a more detailed exemplary embodiment of the mobile computing device 200 and the components included therein. The mobile device 200 includes one or more processors 201 that operate as a controller for controlling the operation of the mobile computing device 200. The processor 201 may be comprised of one or more circuits executing one or more applications stored in a RAM 204, ROM 205 and/or a storage device 210. In one embodiment the processor 201 may include a CPU, EEPROM, Flash, SRAM. The digital signal processing unit 203 is connected to an audio input unit 201 connected to a microphone 213, an audio output unit 202 connected to a speaker 214, and an RF input/output unit 204 connected to an antenna 212. The digital signal processing unit 203 encodes a digital audio signal, and decodes data into a digital audio signal.

Mobile computing device 200 also includes the user interface 202. The user interface 202 includes hardware, software, or both for providing the functionality of the user interface 202. The user interface 202 may receive input signals from a user and generate output signals that are displayed by a display device. The display device may be embodied within the user interface 202 or electrically coupled thereto. The user interface 202 facilitates interaction between a user and the mobile computing device 200. In some embodiments, the user interface 202 facilitates the interaction between the mobile computing device 200 and other devices such as the image processing device 100 and the one or more servers 20 shown in FIG. 1.

The user interface 202 may receive information from one or more applications executing on the mobile computing device 200 that controls the operation of the user interface 212 to implement the functions of the application providing the control signals. In some embodiments, the information received includes data objects defining the structure and type of output to be generated by the user interface 202. By way of non-limiting example, the user interface may output data objects representative of elements to be included in a graphical user interface associated with at least one of the functions of the application which provided the instructions. The user interface 202 may use these data objects and generate the graphical user interface based on these data objects.

In some embodiments, the user interface 202 receives input data signals generated by an input/output (I/O) device in order to facilitate the interaction referenced above and described in further detail below. Exemplary I/O devices include but are not limited to keyboards, mouse, touch sensitive displays, microphones, gesture-based input devices and the like. The user interface 202 may include a display apparatus such as an LCD or LED screen on which the user interface is display and from which the user interface may receive inputs from the user. For example, the display may be a touch-sensitive display that selectively detects touch and/or pressure applied thereto by a user in order to register that an input is being received by the mobile computing device 200.

Mobile computing device 200 may also include an audio input interface 230 that senses or otherwise detects ambient sound signals 231 which may be input to and processed by one or more applications executing on the mobile computing device. By way of example, and not meant to be limiting, a telephone application may be executing and control the audio input interface 230 to capture sounds spoken by a user of the mobile computing device who is placing a telephone call. In another example, an image capturing application able to capture audiovisual data may control the audio input interface 230 to receive ambient audio to be combined with a series of moving images being captured by an image capture device 203. Similarly, an audio output interface 232 may be controlled by one or more applications to output audio data signals 233 representing audio data stored on the storage medium 210 of the mobile computing device or which is stored on a remotely located computing device but is being accessed by one or more applications executing on the mobile computing device 200. In one embodiment, the rendering application 212 may selectively control either or both the audio input interface 230 and/or audio output interface 232 in order to obtain data input values to be entered into one or more data fields as determined by the format data object described above in FIG. 1. By way of example, and not to be considered limiting in any manner, the rendering application 212 may control the audio input interface 209 to record signal 231 representing a user's voice or to record any ambient sound surrounding the mobile computing device at a given time. In another embodiment, the rendering application 212 may control the audio output interface 232 to output signal 233 representing a verbalization of the form currently being displayed on the user interface 202 of the mobile computing device. For example, to enable persons with visual disabilities, the form data object may include data describing the various form fields and required type of data which can be audibilized by the rendering application and output via audio output interface 230 as output signal 233.

A GPS unit 234 may include one or more dedicated processing units and antenna configured to transmit and receive GPS signal data 235. The GPS Unit 234 may be controlled to operate by one or more applications executing on the mobile computing device 200. Additionally, data processed by the GPS unit 234, including specific location data identifying a current location of a user of the mobile computing device 200 may be accessible by other applications executing on the mobile computing device such as the rendering application 212 discussed above in FIG. 1 and hereinafter with respect to FIG. 2. The audio input unit 201 converts an analog audio signal from the microphone 213 into a digital signal. The audio output unit 202 outputs a received digital audio signal from the speaker. The RF input/output unit 204 transmits/receives RF signals.

An image capture device 203 may also be included in the mobile computing device 203. The image capture device 2013 may be controlled by one or more image capturing and processing applications executing on the mobile computing device 200. The image capture device may sense one of still and/or moving image data and capture the sensed data for storage in the RAM 204 until completion of the capture is detected and a data object representing the image and/or moving image can be created and stored in the storage medium 210.

The communication interface 220 is described above in FIG. 1 and is shown in greater detail herein. The communication interface 220 includes one or more discrete communication units that enable a specific type of communication. Each of the units described herein (both with respect to FIG. 2 and elsewhere throughout the description) include hardware and software that enables the specific functionality described therein. For example, the units may include CPU's, memory, I/O ports, antennas all controlled by one or more software applications stored in and executed by the one or more processors of the discrete units or the one or more processors 201 of the mobile computing device 200. Similarly to the image forming apparatus, the mobile computing device may include an short distance communications units such as NFC unit 221, Bluetooth unit 222 and an IR unit 223 the functionality and operation thereof was described in FIG. 1 and is hereby incorporated by reference. Also included in the communication interface 220 is a WIFI unit 224 (or other network access unit) that enables packetized communication via a communication network to occur between the mobile computing device 200 and any other computing device such as server 20 in FIG. 1. The WIFI unit 224 enables network communication with any of a LAN or WAN. Additionally a cellular communication unit 225 is also provided. The cellular unit 225 includes the hardware able to send and receive RF signals via a cellular network. The cellular unit 225 facilitates signal transfer and hand-offs between various cellular communication tower no matter the position of the mobile computing device 200 to allow for consistent streamline voice and data communication between the mobile computing device 200 and other computing devices via a cellular network (not shown).

The following description of FIGS. 3-8 will describe the operation of the communication application 120 of the image processing device and the rendering application 212 of the mobile computing device. Each will be discussed separately and together depending on the particular figure being described. Additionally the following description will reference the components of the image processing device 100 of FIG. 1 and/or the mobile computing device 200 of FIG. 2.

Figure 3:
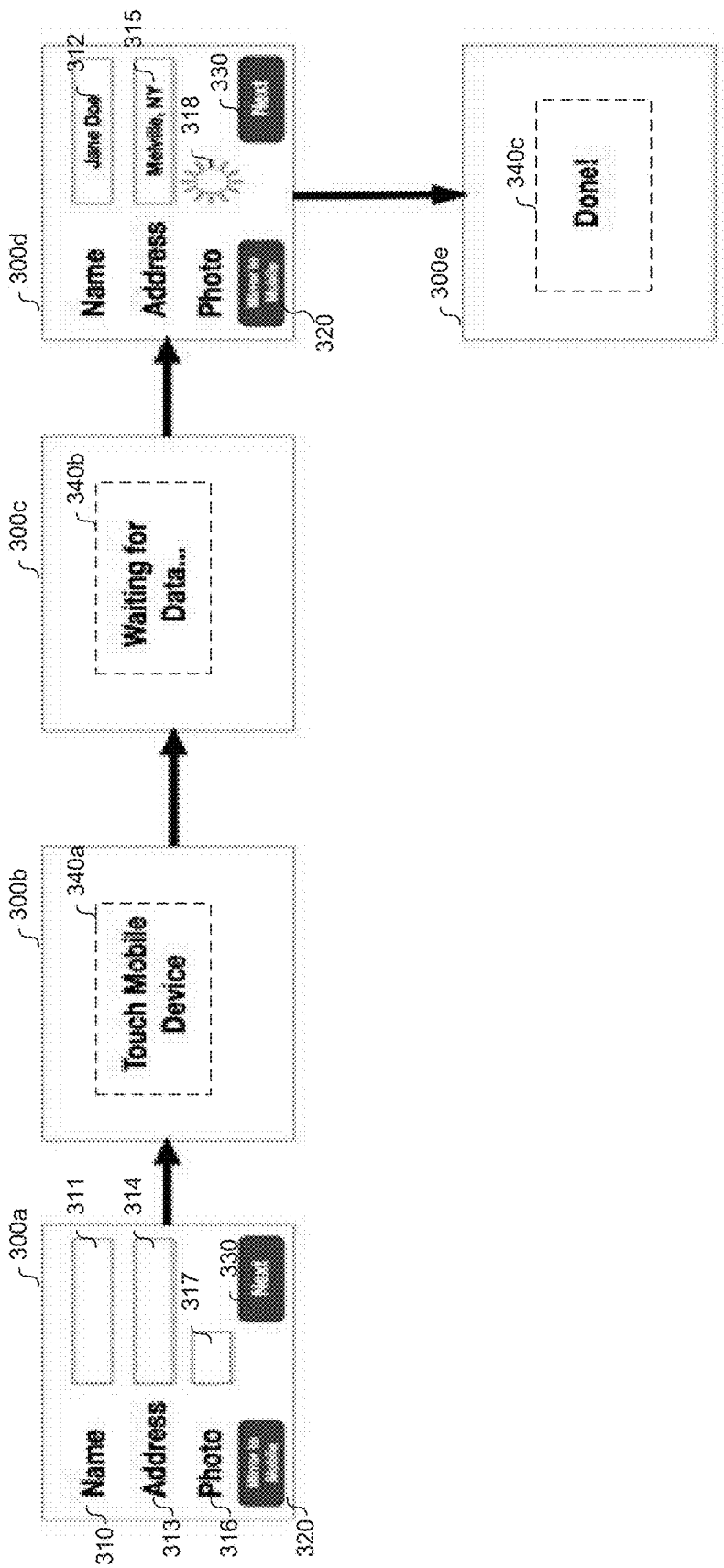
FIG. 3 is a visual flow diagram illustrating a sequence of user interface display images.

FIG. 3 is a visual flow diagram detailing various user interface display screens, referred generally by reference numeral 300, that are generated by the communication application 120 executing on the image processing device 100.

Operation begins when communication application 120 is initiated by a user at the image processing device 100. This may occur after a user has been authenticated as a valid user by a credential-based authentication system. The communication application 120 may be initiated in response to initiation of a job processing application and be used to provide data describing or otherwise characterizing the initiated job. For example, a job processing applications may include scan processing whereby controls the scan unit 115 to create a digitized version of hard copy documents by capturing images thereof and creating a scan data object which can be further processed and/or transmitted to a destination system. In this example, the communication application 120 enables a user to enter data to be associated with the scan data object generated by the scan processing. In another embodiment, instead of being initiated by a user, the communication application 120 may be a subroutine that is automatically initiated when any other type of application is selected by a user. Continuing with the scan job processing described above, when a user wishes to create a scan job that includes at least one other type of data to be input by a user and associated with the completed scan job, the communication application 120 may generate a user selectable image element that will be inserted into and displayed within a job processing user interface displayed by the image processing device 100.

A first user interface display screen 300a is provided which displays a data entry form. The form generated by the application includes at least one type of data required by the application and at least one type of data entry image element associated therewith. This provides the user with a description of the type of data required and the manner in which the data can be input. In the example shown herein, a first type of data 310 required is a name of a user and the associated data entry field 311 may include a free form text entry data field enabling the user to manually enter alphanumeric data therein defining, as an input value, the name of the user. A second type of data 313 may represent address data describing the address of a user and an associated data entry field 314 may also be a free form text entry data field. A third type of data 316 may be image data requiring that an image be associated therewith. The data entry field 317 may be a user selectable image element that enables a user to capture and/or browse a storage device for image data.

Traditionally, a user may use the user interface display screen to enter the data directly into the image processing device 100. However, the drawback associated therewith is that it may be difficult or cumbersome for a user to manually enter the data on the user interface of the image processing device. To remedy this drawback, the application 120 may generate, for inclusion within the user interface 300a, a user selectable image element 320 that, when selected will initiate mirror processing. Mirror processing causes the application 120 to derive configuration data from the user interface 300a and compile the configuration information into a form data object. The form data object includes data type identifiers that identify the type of data required by the form and field type identifiers that identify a manner for entering and/or otherwise accessing data corresponding to the data type identified by the data type identifiers. Each respective data type identifier and field type identifiers are grouped together. For example, for the form displayed in user interface 300a, the form data object will contain three (3) groups, each corresponding to the type of data and data entry field. The structure of the form data object having groups provides another advantage in that a computing device on which the form will be mirrored may use the ordering to configure how and where each of the types of data and corresponding data fields will be displayed within a user interface on the computing device. In another embodiment, the groups may be structure such that similar types of data may be grouped together. For example, a first group may include all data fields that require text-based values to be input therein and a second group may include all data fields that require other types of input values (e.g. drop-down selections, check boxes, etc.). Further description detailing the manner in which the form data object is generated will be provided in FIG. 4A-4D.

Application 120 generates a further user interface 300b including an instruction message 304a instructing a user to position the mobile computing device 200 on which the user interface display 300a is to be mirrored within a predetermined proximity to the image processing device 100. A short distance communication protocol will be used to enable communication between the mobile computing device 100 and the image processing device. For purposes of this application, the short distance communication protocol used will be near field communication (NFC) protocol. The NFC unit 131 of the image processing device 100 will sense the presence of a corresponding NFC identifier tag included and associated with the NFC unit 231 of the mobile computing device. Thereafter, the form data object generated by the application 120 will be communicated to and received by the NFC unit 231 of the mobile computing device 200. Upon transmission of the form data object, application 120 generates a further display image 300c including a status message 340b indicating that application 120 is awaiting receipt of a return data object from the mobile computing device 200. Operation at the mobile computing device will be described later with respect to FIGS. 5A and 5B.

The NFC unit 131 is in a ready state and waits for a user to re-engage the mobile computing device with the image processing device 100 by bringing the mobile computing device within a predetermined distance of the image processing device 100. The NFC unit 131 receives the return data object from the mobile computing device. The return data object includes substantially the same information included in the form data object but further includes the data values that have been entered by the user via the mobile computing device. The application 120 parses the return data object to identify the groups of data types specified in the form data object and identifies respective data values entered by the user on the mobile computing device to generate a completed form user interface 300d. The completed form user interface 300d is generated by application to take the data values contained in the return data object and automatically populate or otherwise enter those values into respective data fields 311, 314 and 317. As shown herein, the return data object included the data value "Jane Doe" 312 for data field 311, "Melville, N.Y." as the data value 315 for data field 314 and an image data 318 to be included as the data value for field 317.

In generating the user interface 300d, application queries return data object and compares the groups in the return data object with those in the format data object. In response to determining that group structure is substantially the same, the application will generate the complete form user interface 300d. In the event that the return data object includes additional group information representing a data type and value that was not included in the form data object, the application will process that data to add it to the completed form user interface 300d. This advantageously enables a user to provide additional information values that were not requested by the form data object but which the user wishes to include as data to be associated with a particular processing job.

An activation image element 330 is also presented in the completed form user interface 300d which, when selected by the user, initiates association of the data values 312, 315 and 318 with any job data being processed by the image processing device. Continuing with the scan job processing, selection of image element 330 initiates scan job processing to convert hardcopy physical documents into digitized electronic documents and associate the data values 312, 315 and 318 with the digitized electronic document. Upon completion of the job processing and data association, a job data object is created and may be provided to a destination system via any data transmission method (e.g. file transfer, network communication, email, SMS, etc.). Once completed a user interface 300e is generated and provides status message 340c indicating to the user that the job and data association is complete.

FIGS. 4A-4D illustrate the creation of the form data object and return data objects used in acquiring input data values for use by the image processing device 100. FIG. 4A includes a user interface display image 400 which may generated by the image processing device 100. The UI 400 depicts an exemplary user-fillable form used in acquiring data to be associated with a processing job to be completed. As shown herein, the form is depicted as groups whereby groups 1 is indicated by reference number 410a, group 2 is indicated by reference number 420a and group 3 is indicated by reference number 430a. Included within each group 410a, 420a, and 430a are at least one type of data to be entered therein and associated data entry field for entering the type of data. In response to selecting mirror processing as discussed above in FIG. 3, application 120 generates a form data object including configuration data that identifies the particular groups included with the UI 400 and, for each identified group, each type of data and associated data entry field. Application generates a form data object which may be compiled as a markup language document such as XML. However, this is described for purposes of example only and the form data object may be provided in any data format.

The generated form data object is depicted in FIG. 4B. Application 120 has identified that UI 400 included 3 groups and, as such, the form data object of 4B includes a first group 450a, a second group 460a and a third group 470a. Structuring of the form data object in this manner allows for a mobile computing device that receives the form data object to easily parse and identify the types of data requested and how to efficiently structure a user interface that is generated by the mobile computing device that is based on the form data object. Now, the contents of the respective groups 450a, 460a and 470a will be described.

In general, the syntax to describe each type of data requested is as follows:

<ID descriptor="Descriptor Value" value="data">

This syntax begins with an ID value which represents a type of data that is required and used by an application 212 executing on the mobile device to determine where data corresponding to that data type may be located on the mobile computing device. A descriptor is provided which provides a description value for the type of data identified by the ID value. Thereafter, a value field including value data is also provided and allows for inclusion of a value corresponding to the type of data corresponding to the ID value in a return data object as shown in FIG. 4C. In the examples shown in FIGS. 4B and 4C, a key is provided that describes the type of data that corresponds to the ID value contained therein. For example, the ID value "t" indicates that text data is required. ID value "e" indicates that data value required is an email address and should correspond to a predetermined format (e.g. _____@_____._____). An "l" ID value indicates that the type of data required is location data and a "d" ID value indicates that the type of data required is representative of a date value. In other exemplary embodiments, the ID value may include "i" which indicates image data or "a" to indicate data from a $3^{rd}$ party application. These ID values and key are provided for purposes of example only and any type of data identified by any ID value may be used. In other embodiments, the syntax described above may include more than one ID value thereby providing the application 212 that processes the form data object with an improved manner in targeting the type of data to be included in the return data object as well as filtering the number of types of applications executing on the mobile phone that is capable of providing the requested type of data.

It should be noted that, while the above description of the form data object is shown in an XML format, this is primarily for purposes of example only to illustrate the principle elements that are needed to describe various data elements in a form data object. Thus, the format data object may be formatted in any data description language such as Java Script Orientation Notation (JSON) or binary notation. The only requirements for the syntax is to include similar elements as discussed above. This includes, but is not limited to, at least one data type ID value identifying the type(s) of data requested, a descriptor value describing the type of data which may be presented in a user interface on a mobile device, and a value parameter that describes a parameter relating to the data value to be input into the data field. An example of how the syntax would be structured should the format data object be formatted in JSON is as follows:

[{"id": "name", "type": "text"},
{"id": "address", "type": "text"},
{"id": "picture", "type": "image"}]

This could define three form items—a text field with an ID of "name", a text field with an ID of "address", and an image field with ID "picture". The image field can be filled in with data from the smartphone camera, for example. This illustrates an exemplary JSON formatting data object and it should be appreciated that any type of data and associated descriptors can easily be incorporated in the above format for a form data object.

In a further embodiment, in a binary notation, data is represented as bits that are transmitted over the wire (or wirelessly). The meaning of the bytes must be established in advance. For example, the structure may use two bits to identify the type of field such as:

| Bits | Meaning |
|------|---------|
| 00 | Text Field |
| 01 | Numeric Field |
| 10 | Image Field |
| 11 | Location (GPS Coordinates) field. |

Thus, the format data object can be represented by transmitting a number of bit pairs to define a form with several fields:

00|00|01|10

This series of two bit pairs would be decoded to mean to a text field, another text field, a numeric field, and an image field. Note that in this example, we have only transmitted the field types. We could include the field IDs as well (as in the previous example), but that would require encoding the field names as bits according to the ASCII or Unicode standard, which is beyond the scope of this example but is understood by a skilled artisan and can readily be accomplished.

In FIG. 4B, the first group 450a includes two types of data to be input by a user. A first type of data has the ID value of "t" indicating that text data is required. The descriptor value associated with the text data is "Name". The descriptor value is derived a value presented in the user interface 400 on the image processing device 100 and will also be used by an application executing on the mobile device to display, to the user, a description for the type of data requested. The value field is left blank because, application 120, when generating the form data object determined that no data value was present in UI 400 but that a data value for the type of data is in fact required. This indicates to the application executing on the mobile computing device that a data entry field should be displayed and to accept an input as a data value. The first group also includes a second type of data representing email data. As such, the ID value is listed as "e" and the descriptor value to be displayed in a UI on the mobile computing device is set equal to "email". Similarly, the data value field is blank.

Turning now to the second group 460a, only a single type of data is requested. The type of data in the second group 460a is location data. As such, the ID value in the tag is "1" and the descriptor value displayed within an UI on a mobile device is set equal to "location". The data field value is blank as no value was detected in the UI 400 on the image processing device 100. A third group 470a contains two different types of data. A first type in the third group 470a is text data identifying a file name. Thus, the ID value is "t" indicating that text data is required and the descriptor value describing the type of data is set to "file name" indicating to a user that the text data will be used a file name for the job being completed by the image processing device. The second type of data in the third group 470a is a date value. The ID value is set equal to "d" and the descriptor value is set equal to "Date".

While the above exemplary form data object includes a plurality of different types of data that have no data values associated therewith, that may not always be the case. For example, during authentication certain information about the user may be acquired from an authentication server and thus may be automatically populated by the image processing device 100 when generating UI 400. In this instance, the form data object may include these types of data therein but the value field in the syntax described above may be populated with a value. For example, the user name in the first group 450a was known, the first tag may have the value set equal to "user name". This information can similarly be provided and displayed to the user in a user interface generated by a mobile computing device based on the form data object and presented to a user on the mobile computing device.

Continuing to FIG. 4C, the form data object of FIG. 4B is received by the communication interface 220 of the mobile computing device 200. Upon receipt thereof, rendering application 212 is initiated and parses the form data object of FIG. 4B. The rendering application uses the tags contained therein to generate UI configuration data that is used to generate a user interface for display in the UI 202 of the mobile computing device 200. The rendering application 212 identifies, from the form data object of FIG. 4B, that there are three groups and configures the UI to include the three regions 410b, 420b and 430b. Positioned within each respective region is the descriptor value and data field corresponding to each type of data requested for the particular region. Additionally, in generating the UI 202, the rendering application 212 queries the operating system of the mobile computing device to identify candidate mechanism that will enable the user to enter the requested data. In one example, where the ID value in a particular tag is set equal to "t", the operating system may return the keyboard functionality as being triggered when a user attempts to enter a data value in the data field corresponding to the descriptor that is identified as a text-type data field. In another example, where the ID value of a particular tab is set equal to "e", the operating system may indicate that one of a keyboard function and a contact management function be made available in response to a user selecting the data field to enter a data value. In this manner, the rendering application identifies at least one candidate application or function that may be used to input a data value into a particular data field selected by a user from within the UI on the mobile computing device. This advantageously enables a user to leverage data values contained within the mobile computing device and not previously accessible to an a image processing device. The result is an improvement in the process of associating data with jobs being processed by the image processing device.

In a further example, if a tag within the form data object includes an ID value set equal to "1", the rendering application can query the operating system for applications able to provide location data such as a GPS Unit 234. The return of that query may simply be a particular data value such as latitude and longitudinal coordinates (or the translated equivalent thereof). Thus, when generating a UI on the mobile computing device, the data field will be automatically populated by the required type of data from the correct data source.

In yet another example, if the tag within the form data object includes an ID value that indicates that image data is required for completing the data field, the rendering application 212 can determine which applications executing on the mobile computing device may be used to supply the requested image data. The rendering application 212 may generate an image element that, when selected generates a further UI including a set of candidate applications or processes which can either capture or provide image data within the form. In this embodiment, a user may select a camera application that will cause the display of the mobile device to display the camera application UI enabling a user to use the image capture device of the mobile computing device 200 to capture an image. In response to capturing the image, the camera application may perform some form of image processing and create an image file data object, a representation of which will automatically be populated within the form UI on the mobile computing device. It should be noted that a full resolution version of the image data may be included in the form as well as a compressed version in both size and byte value may also be provided.

In response to completing all of the data fields representing each type of data requested in the form data object, rendering application 212 generates a return data object that includes substantially the same information contained in the form data object. The return data object further includes data values that were input by the user either directly or acquired from a data source on the mobile computing device such as the GPS unit, the camera application, etc. The return data object is shown in FIG. 4C and each respective data value for the respective types of data requested is shown within the quotation marks showing that the "value" is present. In some embodiments, the return data object includes all of the data entered by the user via the mobile device. In other instances, data values may be of a large size or contained in a discrete data object because they were generated by an external application such as an image capturing application. In these cases, the return data object may also include a pointer identifying a location at which the complete data object generated by the external application may be located and acquired by the image processing device. This complete data object generated by the external application may be communicated simultaneously with the return data object whereby pointer can identify to the image processing device how to retrieve and use the data object generated by the external application.

Further, there may be a case where a discrete data object or file generated by an external application or, in the instance that the data input value input into the user interface of the mobile device, results in a data object has a size equal to greater than a threshold data object size (e.g. large file format) supported by the short distance communication protocol. In this case the return data object may contain a mapping element that points to a location on the mobile device that stores the large file format data object. The mapping element also triggers the communication application 120 executing on the image processing device 100 to initiate a second communication mode using a short distance communication protocol different from the initial short distance communication protocol that is capable of transmitting data object of that size. Thus, the mapping element of the return data object causes the communication application to initiate a short distance communication protocol, using the mapping element data, to establish communication with the mobile computing device and acquire the large file format data object from the mobile computing device to thereby incorporate the data object into the form on the image processing device. For example, the initial contact between the image processing device 100 and mobile computing device may occur via NFC communication. However, based on the size of the data object generated by the mobile computing device 200 and transferred back to the image processing device 100, the mapping element triggers the establishment of a Bluetooth connection between the devices which enables file transfer of the large file format data object. In another embodiment, this manner of communicating the large file format data object may also be used to communicate the entire return data object at all times.

The return data object is received at the image processing device 100 via short distance communication protocol (e.g. NFC). The communication application 120 receives the return data object and parses the return data object to identify the data values specified therein. These values are then incorporated in the GUI 400 and will be used as information associated with any job processing that is about to occur. In this manner, receiving the return data object including the data values enables a user to enter data in a manner and source that is heretofore unavailable to the image processing device.

Figure 5:
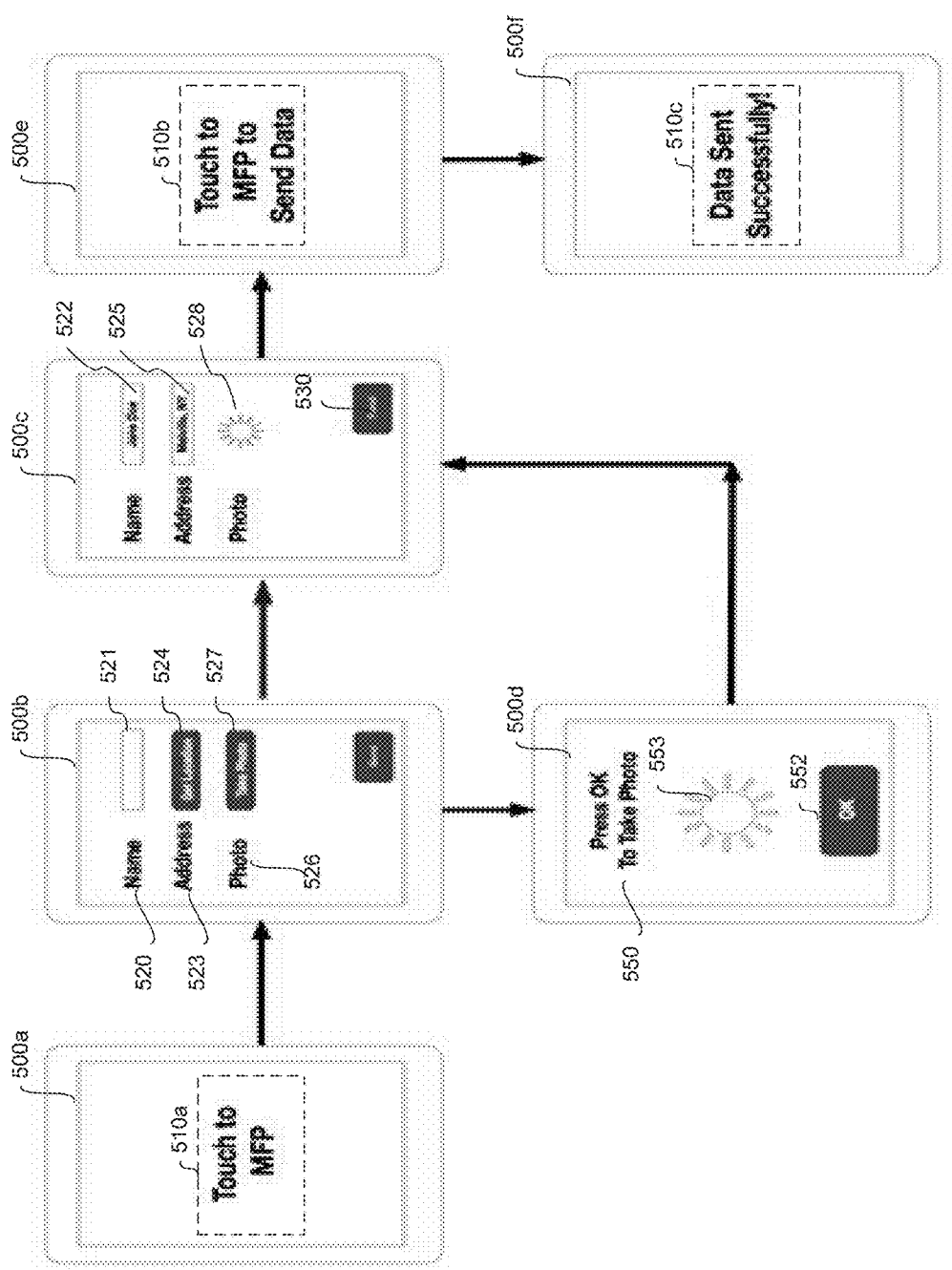
FIG. 5 is a visual flow diagram illustrating a sequence of user interface display images.

FIG. 5 provides a visual flow diagram detailing the various user interfaces generated by the rendering application 212 in response to receiving the form data object including form data from the image processing device via short distance communication protocol (NFC). A first UI 500a may be generated by the rendering application 212 including an instruction message 510 directing the user to position the mobile computing device 200 in within a predetermined distance from the image processing device 100. The first UI 500a may be generated in response to a user initiating the application on the mobile computing device. In another embodiment, the first UI 500a is not display at all and instead, the rendering application 212 is automatically initiated in response to positioning the mobile computing device within the predetermined distance from the image processing device 100. The NFC unit 231 in the mobile computing device then determines that the mobile computing device 200 and image processing device 100 are paired and able to communicate with one another.

In response to the mobile computing device 200 being connected via NFC with the image processing device 100, the form data object generated by the communication application executing on the image processing device 100 is received and processed by the rendering application 212 to derive the different types of data requested by the form associated with the form data object and identify the respective mechanisms available through usage of the mobile computing device 200 in which the requested type of data may be entered. An example of the structure of the form data object and the manner in which it is processed to generate a mobile UI including the form data is described above in FIGS. 4A-4D and is incorporated herein by reference.

In this embodiment, the rendering application 212 has parsed the form data object and determined that three types of data are requested. A first type of data 520 corresponds to a name of a user and a free form text entry data field 521 is provided for renting a value corresponding to the name of a user. A user can select this data field 521 via touch or other pointing mechanism (e.g. stylus, trackball, etc.) to enter data therein. As the rendering application has determined that the type of data required is "text" the rendering application will automatically launch a text entry application or function (e.g. automatically modify the UI 500b to display the form along with a series of user selectable image elements representing a keyboard) allowing the user to enter a data value in the field.

A second type of data 523 corresponds to a location of the user. To enter a value for this type of data, an action image element 524 is generated by the rendering application 212 and included in line with the second type of data description value. Selecting the action image element 524 causes the rendering application 212 to contact the operating system to identify at least one application executing on the mobile device that is able to provide location data. In this instance, the query will result in accessing GPS data from the GPS unit 234 of the mobile computing device and selection of the action image element 524 results in the automatic importation of a GPS data value into the form. As such, the action image element 524 will be replaced with a completed data field including the GPS data value (see 525 in 500d).

A third type of data 326 is also requested by the form data object. The third type of data is image data and includes a corresponding action image element 527. In response to selection of action image element 527, the rendering application queries the operating system to identify at least one type of application that can provide image data within the form. In the embodiment shown herein, the query by rendering application 212 returned the result of an image capture application that controls the image capture device of the mobile computing device to capture an image and generate an image file data object for inclusion into the form. In doing so, the rendering application temporarily suspends its own processing and causes an instance of the image capture application to run while shifting its own processing to a different portion in the active work memory of the mobile computing device 200 while remaining active so as to know when interaction with the external application is complete. The result is generation of an external application user interface 550 in UI 500c. In this embodiment, the external application UI 550 is for an image capture application that allows a user to selectively capture an image 553 when selecting an "ok" image element 552 simultaneously displayed within the UI 550. Once captured, the image data file incorporated into the mobile UI 500d as object 528. Typically, the visual representation of object 528 will be of reduced size and quality and be proportional to the size of the particular mobile computing device 200.

In another embodiment, rendering application 212 generates an action image element for association with each type of data requested by the form. When selected, each action image element may generate an external application request to be made to the operating system of the mobile computing device to identify and provide access to one or more external applications able to generate the type of data required as input by the form data object. In doing so, the operating system query may use the ID value for the type of data to determine which type of data is being requested and identify which, if any, external applications executing on the image processing device can be used to provide that type of data. The result of the query may be provided with in a window within the UI or as a separate UI containing a candidate set of external applications that are able to provide the requested type of data into the form. For example, as shown herein, the second type of data is location data and, as described above, the location data may be acquired via the GPU unit 234. However, and by way of non-limiting example, selection of this other action image element may result in the operating system including a contacts management application having records of user contacts where at least some of which include location (or address) information. The contact management application may be accessed by a user to identify the particular data value to specified as location data from one or more of the records managed by the contact management application.

Further in UI 500d, a "send" image element 530 is provided that, when selected results in generation of the return data object which includes all of the data values 522, 525 and 528 into the form using the rendering application 212. The return data object may be in the same format as the form data object received by the rendering application. An example of the return data object and how it is generated is described above in FIGS. 4A-4D which is incorporated herein by reference.

Figure 6:
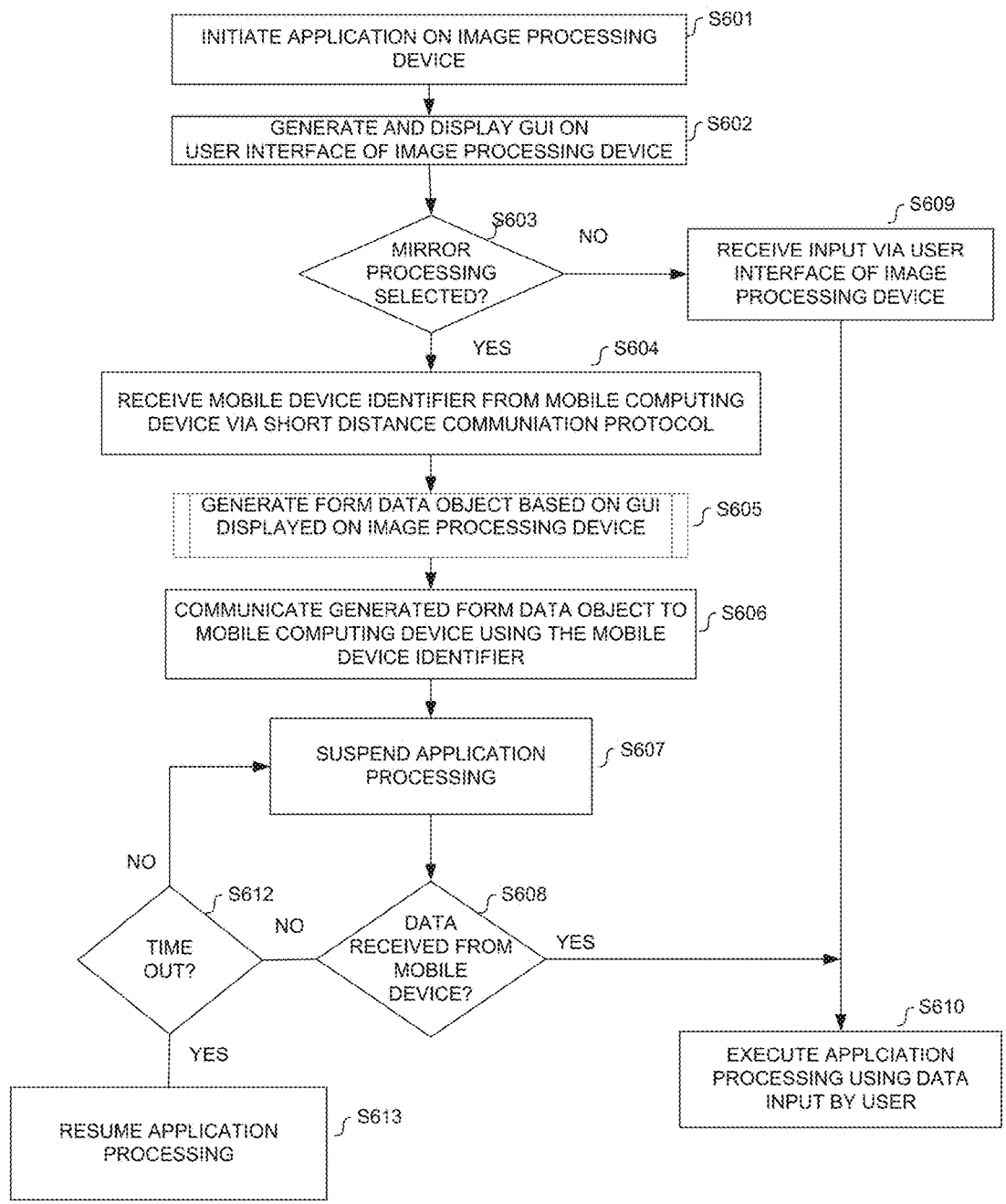
FIG. 6 is a flow diagram detailing exemplary operation according to invention principles.
Figure 7:
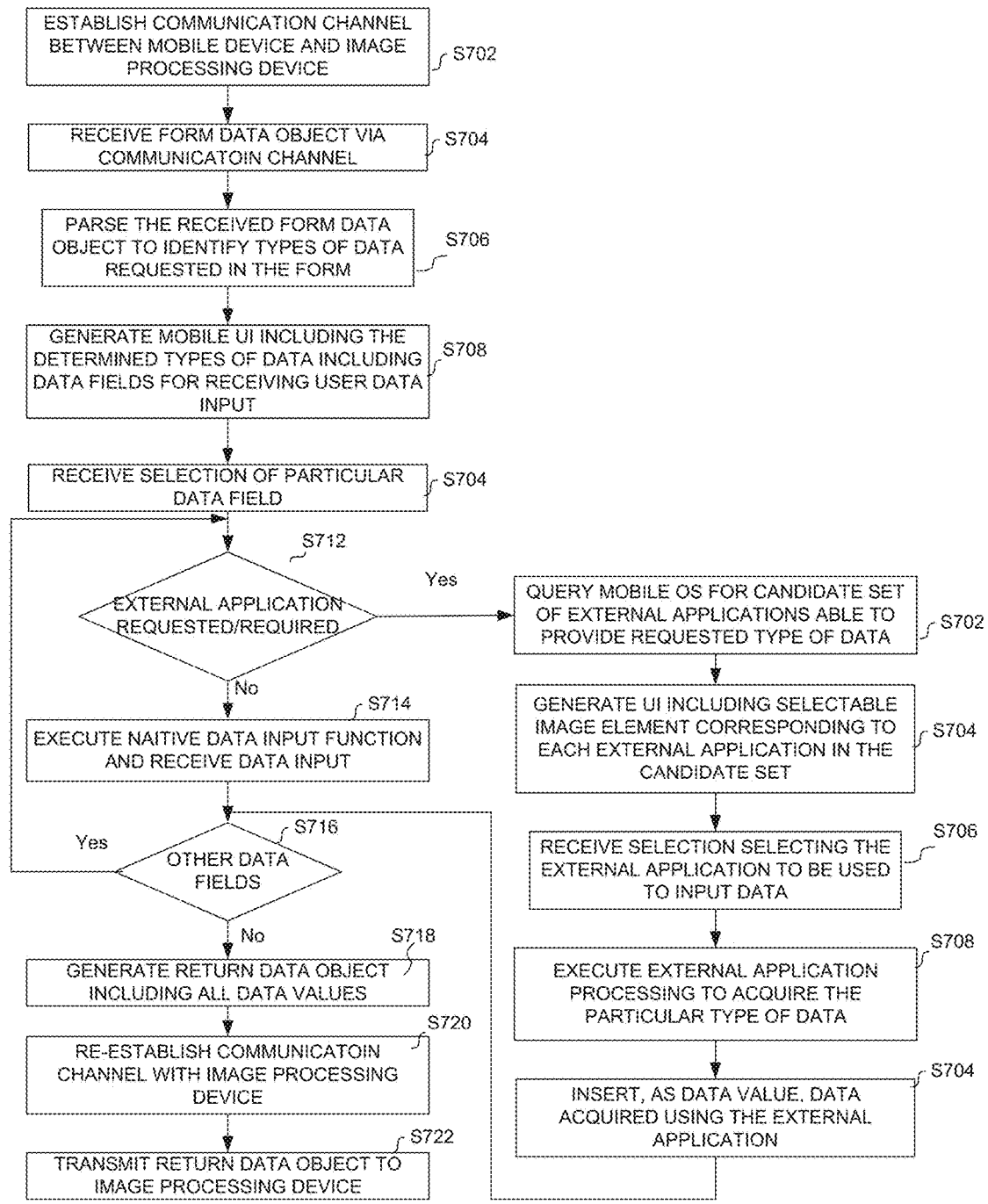
FIG. 7 is a flow diagram detailing exemplary operation according to invention principles.

FIGS. 6 and 7 are flow diagrams detailing sets of instructions that may be embodied as applications able to be executed by one or more processors on either the image processing device 100 or mobile computing devices. FIG. 6 illustrates the operational flow algorithm of an application executing on the image processing device. In step S601, an application for performing a particular type of job processing is initiated on the image processing device 101. In one embodiment, the job processing performed by the application is a scan job which captures images of at least one physical document and creates electronic document data therefrom. In other embodiments, the job processing may include print processing whereby the image processing device receives data from another computing system to be output by the print unit. In a further embodiment, the job processing may include document duplication processing whereby a physical copy of a set of physical documents are made. In any event, the job processing performed by application includes a data association feature whereby form data requesting input of specific types of data values is provided and is to be completed in conjunction with job processing. In step S602, a UI is generated by an application. The UI includes form data that identifies at least one type of data to be input there and includes a description value describing the type of data to be input along with a data field enabling input of a data value therein. This is the form data referenced in step S601 that is used to acquired information which will ultimately be associated with a particular job being processed by the application.

In step S603, it is determined whether a mirror processing feature has been selected. Step S603 may occur by determining if a user has selected a button or image element on the UI of the image processing device 100. In other embodiments, step S601 may occur in response to a short distance communication interface sensing the presence of a mobile computing device 200. If the result of the query in S603 is negative (NO in 603), application, in step S609, enables the user to input respective data values for the respective requested type of data directly within the form displayed in the UI of the image processing device 100. Thereafter, in step S610, job processing is performed by the application and the data input in S609 is automatically associated with the completed job processed by the application.

If the result of the query in S603 is positive, a mobile device identifier corresponding to a particular mobile device is received via short distance communication protocol such as NFC as shown in S604. A form data object generation routine is performed in S605 whereby the application uses the form displayed in the UI to generate configuration information for use in configuring a form data object to include all respective types of data, their respective description values and data fields. An exemplary routine for generating the form data object is described above with respect to FIGS. 4A-4D and is incorporated herein by reference.

In step S606, upon generation of the form data object, application initiates short distance communication process via NFC unit 131 of the image processing device using the identifier received in step S604. The application may suspend its processing in step S607 such that no other user is able to use the image processing device 100 until data is received from a mobile device or a time out has occurred. In another embodiment, suspending application processing S607 may result in temporarily suspending a user's logon session thereby freeing up the image processing device for other user's while the application awaits return data from the mobile computing device. In step S608, application queries whether any return data objects have been received from a mobile computing device. If the result of this query is positive (YES in S608), the job processing of the application is executed and the data values contained in the return data object are associated with the job data produced by the application (e.g. scan job data).

In some embodiments, after determining that a return data object has been received via short distance communication protocol from a mobile device, the application performs a quality check to ensure that the return data object was received from a mobile device having a mobile device identifier equal to that obtained in S604. Additionally, application may also parse the return data object to ensure that all data fields have data values contained therein. If they do not, the application may generate a warning screen for presentation to a user that will notify the user that a particular data field has a null value and allow the user to determine whether or not they wish to proceed to S610. Further, in an instance that the return data object includes additional type of data and associated data values that were not included in the form data object communicated in S606, the application may generate a UI indicating this fact to the user prior to proceeding to S610.

Turning back to S608, if the result of the query is negative (NO in S608), application will determine if a predetermine time period has expired in S612. If not (NO in S612) the application will revert back to S608. If the result of the query in S612 id positive (YES in S612), the application will resume processing in S613 to allow the user to try to input data values again using the mirror processor (S603) or directly into the UI (S609).

FIG. 7 provides the operational flow diagram detailing the operation of a mobile application that receives form data object in order to mirror a user interface display screen presented on an image processing device 100 within a user interface display screen of the mobile computing device 200. In step S702, the mobile application engages the short distance communication units to establish a short distance communication channel between the mobile computing device 200 and the image processing device. Step S702 may be performed using the NFC unit 231 of the mobile computing device 200 which, when brought within a predetermined distance of the image processing device 100, may present a mobile identifier (e.g. NFC tag value) for receipt by the short distance communication interface 130 of the image processing device.

Once the communication channel has been established, a form data object generated by the application executing on the image processing device is received via the communication channel in step S704. In step S706, the mobile application parses the form data object to identify the types of data requested in the form as well as descriptor values that describe the requested types of data. An example as to how step S706 is performed can be found in the description of FIGS. 4A-4D above and which is incorporated herein by reference. In step S708, the information derived from parsing the form data object is used by the mobile application to generate a mobile UI which essentially mirrors the UI that was displayed on the image processing device 100 and from which the form data object was generated. For example, the form data object may group particular types of requested data into groups or regions that enable the mobile application to organize and reproduce with the mobile UI generated thereby. In some embodiments, step S708 includes generating one or more user selectable image elements associated with various data fields and corresponding types of data. The selectable image elements enable a user to initiate an external application from which a data value may be acquired and input into the associated data field. In other embodiments, and in order to save screen resources from overcrowding, when step S708 includes a data valuable obtainable via an external application, the UI may omit generation of the data field and instead only generate a user selectable image element to initiate the external application and replace the image element with a data value acquired using the external application.

In a further embodiment, steps S706 and S708 may, in response to determining that a type of data requested can be obtained automatically from one or more resources executing on the mobile computing device, the UI generated in S708 may be automatically populated with the corresponding data value. An example of this is when, in S706, the mobile application determines from parsing the form data object, that one of the respective types of data requested is location data. In response to this determination, the mobile application may automatically access an external application controlling a resource of the mobile device such as GPS unit 234 and obtain GPS data as location data. The retrieved location data may be automatically input (either as coordinates or translated into town and state, etc.) into the data field associated with the location type data requested in the form.

Continuing onto step S710, the mobile application enables receipt of a selection by a user of a respective data field corresponding to a respective type of data. The receipt of the selection may be sensed by a touch sensitive display of the mobile computing device for example. In response to selection of a respective data field, the mobile application determines, in step S712, if the data field is fillable using a native function. In one embodiment, a native function may represent any feature of the operating system such as keyboard or sensing a further touch from a user representing a selection of an item displayed within the UI (e.g. selection from a drop-down list). The determination in S712 may be made using information contained with the form data object identifying a type of data and source for obtaining that data whereby the mobile application parses the form data object to identify ID values and compare those ID values with an ID value map that maps an ID value with one or more types of external applications able to provide the particular type of data.

If the result of the query in S712 is positive (YES in S712), the mobile application queries the mobile operating system for a candidate set of external applications able to provide the requested type of data in S713. This query may be performed by identifying the ID value indicating the type of data, determining from the ID value the type of data requested and querying which applications or other resources executing on the mobile computing device is able to provide the particular type of data. In another embodiment, the mobile application may use the ID value to compare to the ID value map and determine from the ID value map, a set of candidate applications able to provide the requested type of data and query the OS to determine what, if any of those external applications are installed on the mobile device.

In response to the query in S713, the mobile application may generate, in step S715, a further UI including selectable image elements corresponding to the candidate set of external applications identified in the S713 query. For example, if the type of data determined to be needed is image data, the query of the OS may result in identifying an image capture application that controls the image capture device of the mobile computing device and an image management application that manages a set of image data that was either previously captured via the image capture device or which was acquired by some other method (e.g. email, SMS, screenshot, etc.). Image elements corresponding to the image capture application and the image management application may be generated for presentation into a UI. This description of types of external applications is merely to illustrate the principles of the invention and should not be construed as limiting. The form data object may request any type of data that can be acquired using at least one external application executing on the mobile computing device. The further UI may be generated and temporarily replace the UI generated in S708 or may be a sub-UI that is overlaid over the UI generated in S708.

The mobile application receives a selection of a particular external application via the UI in step S717 and causes the selected external application to be executed in S719. Thus, a mobile device executes a full instance of the selected external application which can then be used in its normal course to obtain, capture or otherwise acquired the particular type of data. For example, in continuing with the example where image data is the desired type of data, step S719 causes the UI for the image capturing application to be presented and provides the user with full functionality thereof. The mobile application may still run in background processing and, in response to detecting that a type of data object corresponding to the type of requested data has been created by the external application, may automatically import the created data object into the mobile UI containing the form data in step S721. Thereafter, operation of the mobile application proceeds to step S716 in which the mobile application determines if any additional data fields that need completion are present. Step S716 and the operations thereafter will be described below.

Returning back to step S712, should the result of the query determining whether or not an external application is requested or required be negative (NO in S712), the mobile application initiates execution of a native data input functionality and receives data thereby. In one exemplary embodiment, in a case where the type of data requested is text data, the mobile application may automatically generate an image element representative of a keyboard with the mobile UI and receive inputs corresponding to certain alphanumeric characters. In step S716, the mobile application determines whether any further data fields associated with other types of requested data are present and need to be completed. If the response to the query in S716 is positive (YES in S716), processing reverts back to S710 whereby the mobile application is able to receive a further selection of a further data field in which a particular data value of a particular type may be entered in accordance with either S712-S714 or S712-S721. If the response to the query in S716 is negative, the mobile application generates a return data object including all data values entered into respective data fields in step S718. In one embodiment, S718 is performed by modifying the form data object tags to input data values in the value portion of each tag thereby transforming the form data object from a first state into a second different state representing a return data object. In another embodiment, the mobile application may generate the return data object de novo in manner similar that the form data object was initially created and incorporating all data values therein. In certain embodiments, the return data object include data values that represent discrete data objects (e.g. data files, image files, etc.). In this instance, the return data object may include a pointer as the data value pointing to a separate data file that is to be transmitted concurrently with the return data object. In other embodiments, the pointer may be address data indicating a location on a computer network at which the data that comprises the data value may be located. Thereafter the return data object is transmitted back to the image processing device in step S722. Step 722 may include re-establishing the communication channel via short distance communication protocol (NFC) by re-positioning the mobile computing device within a predetermined distance of the image processing device. Once within the predetermined distance, the return data object and any associated return objects (e.g. image files, data files, etc.) may be transferred back to the image processing device for use in associating the data values with a particular job being processed at a given time by the image processing device.

In some embodiments, step S722 may include having a return data object formatted to include at least one mapping element to identifies a location in a storage device of the mobile computing device that a particular data object may reside. The mapping element triggers initiation of a second communication mode using a second communication protocol to establish the communication channel between the mobile computing device 200 and the image processing device 100. Once established the return data object and any associated data objects may be communicated back from the particular location identified in the mapping element and located on the mobile computing device to the image processing device 100 for incorporation into the form and associated with the job data.

Figure 8:
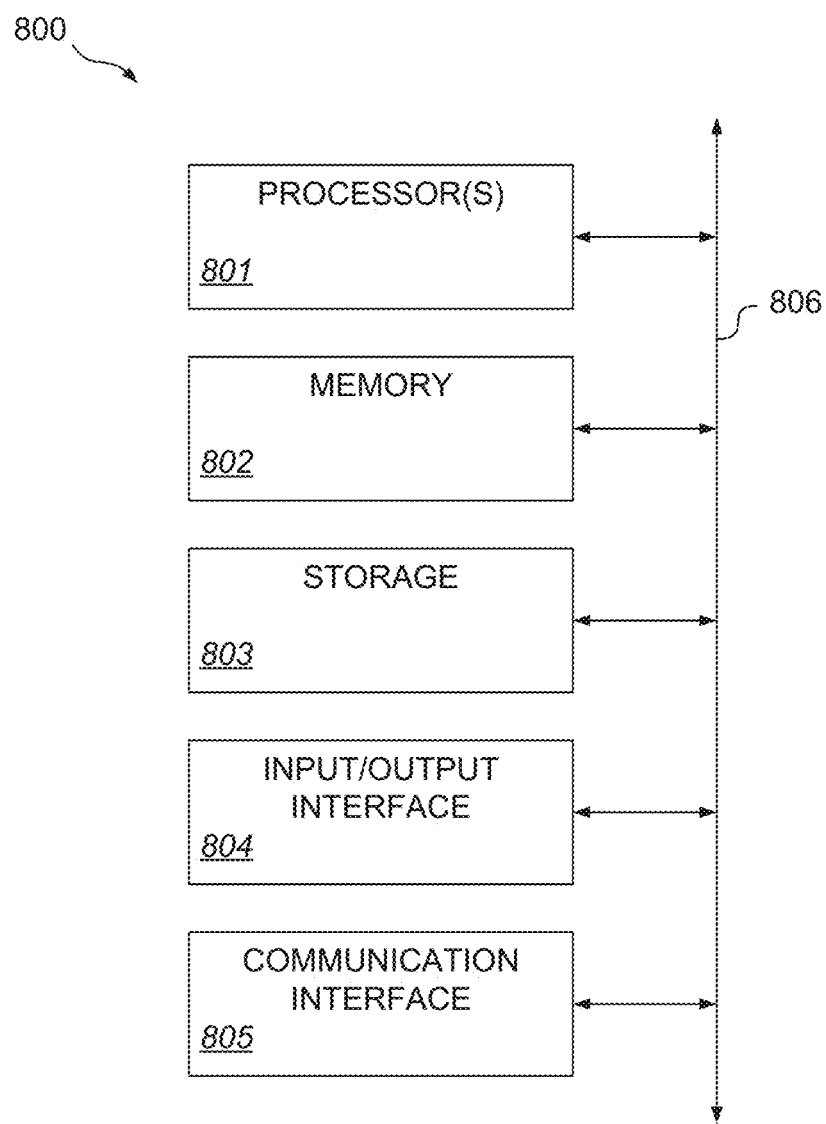
FIG. 8 illustrates an exemplary computing device.

FIG. 8 illustrates the hardware components of an exemplary server 800 or any other computing system able with which the image processing device 80 may communicate. According to various embodiments, all or a portion of the description of the server 800 is applicable to all or a portion of one or more of the server 50 or any other computing system. Additionally, the descriptions of the hardware components contained herein apply to similarly named hardware components in any of the image processing device 80 and mobile computing device 200.

The term server (or computing system) as used herein includes but is not limited to one or more software modules, one or more hardware modules, one or more firmware modules, or combinations thereof, that work together to perform operations on electronic data. The physical layout of the modules may vary. A server may include multiple computing devices coupled via a network. A server may include a single computing device where internal modules (such as a memory and processor) work together to perform operations on electronic data. Also, the term resource as used herein includes but is not limited to an object that can be processed at a server. A resource can be a portion of executable instructions or data.

In some embodiments, the server 800 performs one or more steps of one or more methods described or illustrated herein. In some embodiments, the server 800 provides functionality described or illustrated herein. In some embodiments, software running on the server 800 performs one or more steps of one or more methods described or illustrated herein or provides functionality described or illustrated herein. Some embodiments include one or more portions of the server 800.

The server 800 includes one or more processor(s) 801, memory 802, storage 803, an input/output (I/O) interface 804, a communication interface 805, and a bus 806. The server 800 may take any suitable physical form. For example, and not by way of limitation, the server 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, PDA, a server, a tablet computer system, or a combination of two or more of these.

The processor(s) 801 include hardware for executing instructions, such as those making up a computer program. The processor(s) 801 may retrieve the instructions from the memory 802, the storage 803, an internal register, or an internal cache. The processor(s) 801 then decode and execute the instructions. Then, the processor(s) 801 write one or more results to the memory 802, the storage 803, the internal register, or the internal cache. The processor(s) 801 may provide the processing capability to execute the operating system, programs, user and application interfaces, and any other functions of the server 800.

The processor(s) 801 may include a central processing unit (CPU), one or more general-purpose microprocessor(s), application-specific microprocessor(s), and/or special purpose microprocessor(s), or some combination of such processing components. The processor(s) 801 may include one or more graphics processors, video processors, audio processors and/or related chip sets.

In some embodiments, the memory 802 includes main memory for storing instructions for the processor(s) 801 to execute or data for the processor(s) 801 to operate on. By way of example, the server 800 may load instructions from the storage 803 or another source to the memory 802. During or after execution of the instructions, the processor(s) 801 may write one or more results (which may be intermediate or final results) to the memory 802. One or more memory buses (which may each include an address bus and a data bus) may couple the processor(s) 801 to the memory 802. One or more memory management units (MMUs) may reside between the processor(s) 801 and the memory 802 and facilitate accesses to the memory 802 requested by the processor(s) 801. The memory 802 may include one or more memories. The memory 802 may be random access memory (RAM).

The storage 803 stores data and/or instructions. As an example and not by way of limitation, the storage 803 may include a hard disk drive, a floppy disk drive, flash memory, an optical disc, a magneto-optical disc, magnetic tape, or a Universal Serial Bus (USB) drive or a combination of two or more of these. In some embodiments, the storage 803 is a removable medium. In some embodiments, the storage 803 is a fixed medium. In some embodiments, the storage 803 is internal to the server 800. In some embodiments, the storage 803 is external to the server 800. In some embodiments, the storage 803 is non-volatile, solid-state memory. In some embodiments, the storage 803 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. The storage 803 may include one or more memory devices. One or more program modules stored in the storage 803 may be configured to cause various operations and processes described herein to be executed.

The I/O interface 804 includes hardware, software, or both providing one or more interfaces for communication between the server 800 and one or more I/O devices. The server 800 may include one or more of these I/O devices, where appropriate. One or more of these I/O devices may enable communication between a person and the server 800. As an example and not by way of limitation, an I/O device may include a keyboard, keypad, microphone, monitor, mouse, speaker, still camera, stylus, tablet, touch screen, trackball, video camera, another suitable I/O device or a combination of two or more of these. An I/O device may include one or more sensors. In some embodiments, the I/O interface 804 includes one or more device or software drivers enabling the processor(s) 801 to drive one or more of these I/O devices. The I/O interface 804 may include one or more I/O interfaces.

The communication interface 805 includes hardware, software, or both providing one or more interfaces for communication (such as, for example, packet-based communication) between the server 800 and one or more other servers or one or more networks. As an example and not by way of limitation, the communication interface 805 may include a network interface card (NIC) or a network controller for communicating with an Ethernet or other wire-based network or a wireless NIC (WNIC) or wireless adapter for communicating with a wireless network, such as a WI-FI network. This disclosure contemplates any suitable network and any suitable communication interface 805 for it. As an example and not by way of limitation, the server 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the server 800 may communicate with a wireless PAN (WPAN) (such as, for example, a Bluetooth WPAN or an ultra wideband (UWB) network), a WI-FI network, a WI-MAX network, a cellular telephone network (such as, for example, a Global System for Mobile Communications (GSM) network), or other suitable wireless network or a combination of two or more of these. Additionally the communication interface may provide the functionality associated with short distance communication protocols such as NFC and thus may include an NFC identifier tag and/or an NFC reader able to read an NFC identifier tag positioned with a predetermined distance of the computing device. The server 800 may include any suitable communication interface 805 for any of these networks, where appropriate. The communication interface 805 may include one or more communication interfaces 805.

The bus 806 interconnects various components of the server 800 thereby enabling the transmission of data and execution of various processes. The bus 806 may include one or more types of bus structures including a memory bus or memory controller, a peripheral bus, and a local bus using any of a variety of bus architectures.

The above description serves to explain principles of the invention; but the invention should not be limited to the examples described above. For example, the order and/or timing of some of the various operations may vary from the examples given above without departing from the scope of the invention. Further by way of example, the type of network and/or servers may vary from the examples given above without departing from the scope of the invention. Other variations from the above-recited examples may also exist without departing from the scope of the invention.

The scope of the present invention includes a non-transitory computer-readable medium storing instructions that, when executed by one or more processors, cause the one or more processors to perform one or more embodiments of the invention described herein. Examples of a computer-readable medium include a hard disk, a floppy disk, a magneto-optical disk (MO), a compact-disk read-only memory (CD-ROM), a compact disk recordable (CD-R), a CD-Rewritable (CD-RW), a digital versatile disk ROM (DVD-ROM), a DVD-RAM, a DVD-RW, a DVD+RW, magnetic tape, a nonvolatile memory card, and a ROM. Computer-executable instructions can also be supplied to the computer-readable storage medium by being downloaded via a network.

While the present invention has been described with reference to exemplary embodiments, it is to be understood that the invention is not limited to the disclosed exemplary embodiments.

We claim:

1. An image processing device comprising:
   one or more processors; and
   a memory coupled to the one or more processors, the memory including instructions stored therein that, when executed by the one or more processors, cause the one or more processors to
      generate a graphical user interface including at least one image element enabling receipt of a data value of a particular type therein, the graphical user interface being generated in response to selecting a processing job to be performed by the image processing device;
      mirror the generated graphical user interface on a mobile computing device by transmitting form object data describing a structure of the graphical user interface including the at least one image element and the particular type of data to be received within the graphical user interface to a mobile computing device via a short distance communication protocol, the form object data being used by the mobile computing device to render the graphical user on the mobile computing device;
      receive a return data object, via the short distance communication protocol, including data describing a modified graphical user interface including the at least one image element having the data value of the particular type, the data value having been input using mobile computing device;
      executing the processing job to generate job data and automatically associating the data value derived from the modified graphical user interface with the generated job data.

2. The image processing device according to claim 1, wherein the instructions, when executed by the one or more processors cause the one or more processors to generate the form data object used to mirror the graphical user interface by
   identifying, from data used to generate the graphical user interface, a number of image elements and data types associated with each identified image element
   group identified image elements requiring a same type of data into respective groups;
   generating a unique tag describing each identified image element including the type of data required thereby;
   creating the form data object including each unique tag; and
   transmitting the form data object via short distance communication protocol to the mobile computing device.

3. The image processing device according to claim 2, wherein the instructions, when executed by the one or more processors cause the one or more processors to generate the unique tag for each image element having an associated data type by
   generating an ID value identifying the particular type of data
   generating a descriptor value describing the image element and type of data, the descriptor value being displayed within the graphical user interface; and
   creating a value parameter describing at least one parameter of the data value being requested by the image element; and
   concatenating the ID value, descriptor value and value parameter to generate the unique tag.

4. The image processing device according to claim 1, wherein the type of data associated with a respective image element includes at least one of (a) text data; (b) location data associated with the mobile computing device; (c) a date value; and (d) selection value data identifying a particular value selected from a candidate set of data values.

5. The image processing device according to claim 1, wherein the type of data
   associated with a respective image element is a type of data generated by at least one external application executing on the mobile computing device.

6. The image processing device according to claim 5, wherein
   the return data object includes a data value derived from the at least one external application executing on the mobile computing device which enables the image processing device to indirectly acquire a data value of a particular type that the image processing device could not acquire directly via the graphical user interface generated thereby.

7. The image processing device according to claim 6, wherein
   the return data object includes additional data values associated with image elements that were not present when the graphical user interface was mirrored on the mobile computing device; and
   the additional data values are associated with the job data.

8. The image processing device according to claim 1, wherein the instructions, when executed by the one or more processors cause the one or more processors to
   suspend the selected processing job on the image processing device when the graphical user interface is mirrored on the mobile computing device.

9. The image processing device according to claim 1, wherein the instructions, when executed by the one or more processors cause the one or more processors to
   detect a presence of a mobile computing device; and
   automatically mirroring the graphical user interface on the mobile computing device enabling entry of the data value associated with the at least one image element by the mobile computing device.

10. A method for controlling an image processing device comprising:
    generating a graphical user interface including at least one image element enabling receipt of a data value of a particular type therein, the graphical user interface being generated in response to selecting a processing job to be performed by the image processing device;

mirroring the generated graphical user interface on a mobile computing device by transmitting a form object data describing a structure of the graphical user interface including the at least one image element and the particular type of data to be received within the graphical user interface to a mobile computing device via a short distance communication protocol, the form data object being used by the mobile computing device to render the graphical user interface on the mobile computing device;

receive a return data object, via the short distance communication protocol, including data describing a modified graphical user interface including the at least one image element having the data value of the particular type, the data value having been input using mobile computing device; and executing the processing job to generate job data and automatically associating the data value derived from the modified graphical user interface with the generated job data.

11. A mobile computing device comprising
one or more processors; and
a memory coupled to the one or more processors, the memory including instructions stored therein that, when executed by the one or more processors, cause the one or more processors to
receive a form data object generated by an image processing device using a short distance communication protocol, the form data object includes data describing a form displayed in a graphical user interface of an image processing device, and the form data object including configuration data used to render, on the mobile computing device, a mobile device user interface including at least one image element have a particular data type associated therewith;
parse the form data object to determine a type of data associated with the at least one image element;
select a function executed by the mobile computing device for inputting a data value corresponding to the determined type of data;
generate, by rendering on the mobile computing device, the mobile user interface based on the form data object and including the selected function enabling receipt of the data value input by a user of the mobile computing device;
create a return data object describing the at least one image element and including the data value entered by the user via the selected function; and
transmit the return data object, via the short distance communication protocol, to the image processing device enabling completion of the form graphical user interface using the data value entered via the mobile computing device.

12. The mobile computing device of claim 11, wherein the selected function represents a native function of a mobile operating system executing on the mobile computing device.

13. The mobile computing device according to claim 11, wherein
the form data object, for each of the at least one image elements, includes a unique tag identifying the type of data requested by the particular image element, a description value to be displayed within the mobile user interface describing the image element and a parameter value identifying at least one constraint to be applied to any data value entered therein.

14. The mobile computing device according to claim 11, wherein the instructions, when executed by the one or more processors cause the one or more processors to
for each of the at least one image elements included in the form data object,
query a mobile operating system using the type of data to identify at least one function from a candidate set of functions able to input a data value satisfying the particular type of data; and
incorporating, into the mobile user interface, an identifier that launches the selected function enabling input of the data value of the particular data type.

15. The mobile computing device 11, wherein
the type of data included in the form data object indicates that the type of data is to be acquired by an external application executing on the mobile device; and the instructions, when executed by the one or more processors cause the one of more processors to
query a mobile operating system for at least one external application able to provide the particular type of data; and
generate an external application image element for inclusion in the mobile user interface, the external application image element being selectable by a user and enables launch of the external application directly from within the mobile user interface.

16. The mobile computing device according to claim 11, wherein
the type of data associated with the at least one image element represents a type of data that is acquired by a function that does not execute on the image processing device or using a device that is not included in the image processing device.

17. The mobile computing device according to claim 11, wherein
in a case that the function selected to input the data value is performed by an external application and the data value input thereby is a discrete data object, the return data object includes a pointer referencing the discrete data object created by the external application and associates the discrete data object with the return data object for transmission to the image processing device.

18. The mobile computing device according to claim 11, wherein
the function selected to input the data value is at least one of (a) a text entry function via display of a keyboard within the mobile user interface; (b) global positioning system (GPS) function provided by a GPS unit that returns real-time location data; (c) a contact management function enabling selection of data associated with one more user contacts; (d) image capture function that controls an image capture device of a mobile computing device to capture image data and generate an image data object; and (e) a biometric function that senses a biometric data value from a user to generate a biometric data object.

19. A method of controlling the operation of a mobile computing device comprising:
receiving a form data object generated by an image processing device using a short distance communication protocol, the form data object including data describing a form displayed in a graphical user interface of an image processing device, and the form data object including configuration data used to render, on the mobile computing device, a mobile device user interface including at least one image element have a particular data type associated therewith;

parsing the form data object to determine a type of data associated with the at least one image element;

selecting a function executed by the mobile computing device for inputting a data value corresponding to the determined type of data;

generating, by rendering on the mobile computing device, the mobile user interface based on the form data object and including the selected function enabling receipt of the data value input by a user of the mobile computing device;

creating a return data object describing the at least one image element and including the data value entered by the user via the selected function; and transmitting the return data object, via the short distance communication protocol, to the image processing device enabling completion of the form graphical user interface using the data value entered via the mobile computing device.

20. A system for inputting data values into a form displayed on an image processing device using a mobile computing device, the system comprising an image processing device that generates a graphical user interface including at least one image element enabling receipt of a data value of a particular type therein, the graphical user interface being generated in response to selecting a processing job to be performed by the image processing device and mirrors the generated graphical user interface on the mobile computing device by transmitting form object data describing a structure of the graphical user interface including the at least one image element and the particular type of data to be received within the graphical user interface to the mobile computing device via a short distance communication protocol, the form object data being used by the mobile computing device to render the graphical user on the mobile computing device; and a mobile computing device that receives the form object data describing the graphical user interface via the short distance communication protocol from the image processing device, parses the data representing the graphical user interface to determine a type of data associated with the at least one image element;

selects a function executed by the mobile computing device for inputting a data value corresponding to the determined type of data;

generates, by rendering on the mobile computing device, the mobile user interface based on the form data object and including the selected function enabling receipt of the data value input by a user of the mobile computing device;

creates a return data object describing the at least one image element and including the data value entered by the user via the selected function; and transmits the return data object, via the short distance communication protocol, to the image processing device, wherein in response to receiving the return data object via the short distance communication protocol, the data values entered via the mobile computing device complete the at least one image element using and the image processing device initiates execution of the processing job to generate job data and automatically associates the data value derived from the modified graphical user interface with the generated job data.

* * * * *